United States Patent [19]
Toyomura et al.

[11] Patent Number: 5,512,986
[45] Date of Patent: Apr. 30, 1996

[54] ELECTROPHOTOGRAPHY APPARATUS

[75] Inventors: Yuuji Toyomura, Fukuoka; Toshiyuki Mouri, Kurume, both of Japan

[73] Assignee: Matsushita Electric Industrial Co., Ltd., Osaka, Japan

[21] Appl. No.: 164,186

[22] Filed: Dec. 9, 1993

[30] Foreign Application Priority Data

Dec. 11, 1992 [JP] Japan .................................. 4-331530

[51] Int. Cl.$^6$ .................................................. G03G 21/00
[52] U.S. Cl. ......................... 355/246; 355/208; 358/448; 358/458
[58] Field of Search ..................... 355/246, 208, 355/326 R, 327, 328; 358/448, 455, 458, 461, 296, 298, 300

[56] References Cited

U.S. PATENT DOCUMENTS

| | | | |
|---|---|---|---|
| 4,641,267 | 2/1987 | Asai et al. | 358/461 X |
| 4,797,943 | 1/1989 | Murayama et al. | 358/458 X |
| 5,117,261 | 5/1992 | Sakai et al. | 355/327 X |
| 5,123,060 | 6/1992 | Cho et al. | 358/458 X |
| 5,148,289 | 9/1992 | Nishiyama et al. | 355/246 X |
| 5,202,773 | 4/1993 | Kato | 358/461 |
| 5,206,686 | 4/1993 | Fukui et al. | 355/208 |
| 5,212,560 | 5/1993 | Hattori et al. | 355/208 X |
| 5,250,959 | 10/1993 | Yamada et al. | 358/298 |
| 5,278,667 | 1/1994 | Takahashi | 358/455 X |
| 5,294,959 | 3/1994 | Nagao et al. | 355/208 |
| 5,315,352 | 5/1994 | Nakane et al. | 355/246 |

FOREIGN PATENT DOCUMENTS 4170564  6/1992  Japan .

*Primary Examiner*—Sandra L. Brase
*Attorney, Agent, or Firm*—Panitch Schwarze Jacobs & Nadel

[57] ABSTRACT

In an electrophotography apparatus, a dark reference is derived from an output of a density sensor detecting a pattern of saturation density, and a highlight reference is derived from an output of the density sensor detecting a surface of an intermediate transfer sheet. Based on these dark reference and the highlight reference, read-in values of gradation correction patterns detected by the density sensor is normalized to make a gradation correction table.

19 Claims, 14 Drawing Sheets

ELECTROPHOTOGRAPHY APPARATUS

FIELD OF THE INVENTION AND RELATED ART STATEMENT

1. Field of the Invention

The present invention relates to an electrophotography apparatus for use as an output unit for a personal computer, a work station or the like.

2. Description of the Related Art

In recent years, a main current of the printer has been a laser beam printer using an electrophotographic process and laser technology because of its predominance in speed and quality of the printing.

The demand for making the laser beam printer full-color has been rising in a market.

In a full-color system, when image density data of one picture element are of 8-bit, 256-gradation is necessary for each color, and outputs of approximately 16,700,000 colors by combinations of cyan, magenta and yellow are necessary. Therefore, reproducibility of gradation is an especially important factor in the full-color system.

In general, this kind of apparatus has the following procedures:

A test pattern for gradation correction is formed on an image holder for forming and holding images by using predetermined image data; this is detected with a density sensor which is an application of a reflection type sensor etc.; nonlinear characteristic of I/O of the equipment is corrected (γ correction), and a parameter of the electrophotographic process is changed.

Hereafter, the conventional electrophotography apparatus will be described. The electrophotography apparatus using an intermediate transfer method is mainly described. In the intermediate transfer method, latent image formed with the laser beam etc. on a photosensitive sheet is developed with a development device for each color. Achromatic image developed is transferred to an image formation medium which is called an intermediate transfer body. After a composition process, a composite image formed on the intermediate transfer body is transferred at once to a paper.

FIG. 12 is an illustration showing a configuration of the conventional electrophotography apparatus. A photosensitive sheet 1 of loop-belt-type is held by three carrying rollers 2, 3 and 4. The photosensitive sheet 1 moves in a direction of arrow d1 by a driving source such as a motor (not shown). A position detection mark 5 for detecting arrival of a specific position of the photosensitive sheet 1 is arranged at an edge part of the photosensitive sheet 1. A position detection sensor 6 for detecting the position detection mark 5 is provided beside the roller 2. The photosensitive sheet 1 has a commissure 7. The commissure 7 must always be stayed outside the image projected on the photosensitive sheet 1 by referring to an output of the position sensor 6.

Around the photosensitive sheet 1, a charger 8, an exposure optical system 9, development devices 10K, 10Y, 10M and 10C for black, yellow, magenta and cyan, respectively, a pre-intermediate-transfer discharger 11, an intermediate transfer roller 12, a cleaning device 13 for the photosensitive sheet 1, and a discharger 14 are provided along the direction of the arrow d1.

The charger 8 is composed of a charging wire made of tungsten etc., a shield board of metal and a grid etc. When a negative high voltage is applied to the charging wire, the charging wire causes corona discharge. When a voltage of −700 V is applied to the grid, a surface of the photosensitive sheet 1 is evenly charged with about a negative potential of −700 V.

The exposure optical system 9 is composed of a laser drive unit, a polygon mirror, a motor for rotating the polygon mirror and a lens system etc. (illustration of these parts is omitted). Exposure rays 15 irradiated from the exposure optical system 9 form on the photosensitive sheet 1 an electrostatic latent image corresponding to image data of specific color. The exposure rays 15 are obtained by modulating pulse-width of the image signal, which is issued from a gradation conversion device etc., with the laser drive circuit.

The development devices 10K, 10Y, 10M and 10C include toner of black, yellow, magenta and cyan, respectively, and they have sleeve rollers 16K, 16Y, 16M and 16C made of conductive rubber etc., respectively. When the sleeve rollers 16K, 16Y, 16M and 16C are rotated clockwise along the direction of the arrow d1, the toner is supplied in the form of thin film from the development devices 10K, 10Y, 10M and 10C to surfaces of the sleeve rollers 16K, 16Y, 16M and 16C, respectively. In a process of forming the toner into a thin film, the toner is charged with negative potential due to friction. The sleeve rollers 16K, 16Y, 16M and 16C are impressed with a negative voltage (developing bias) and rotated. Cams 17K, 17Y, 17M and 17C are driven by motors (not shown) to move the development devices 10K, 10Y, 10M and 10C in a direction of an arrow d3, respectively. For instance, when the cam 17K is driven to thereby push the development device 10K rightward (direction of d3), the sleeve roller 16K makes contact with the photosensitive sheet 1. That is, a contact development method is employed by utilizing a nonmagnetic single component toner.

A surface potential (bright potential) of a part of the photosensitive sheet 1 on which the latent image is formed is approximately from −50 to −100 V. By impressing the sleeve roller 16K with a negative voltage about −300 V, an electric field is generated in a direction from the photosensitive sheet 1 to the sleeve roller 16K. As a result, the Coulomb force acts on the negatively charged toner on the sleeve roller 16K in a direction reverse to the direction of electric field. Therefore, the toner is attracted to the photosensitive sheet 1 and is attached on the latent image formed on the photosensitive sheet 1. A surface potential (dark potential) of a part of the photosensitive sheet 1 on which no latent image is formed is −700 V. Therefore, when the development bias is applied to it, an electric field is generated in a direction from the sleeve roller 16K to the photosensitive sheet 1. As a result, no toner is attached onto the photosensitive sheet 1. As has been described above, a toner image is formed by the development through the negative-positive process.

The pre-intermediate-transfer discharger 11 includes therein plural red LED (not shown) aligned on a straight line. The pre-intermediate-transfer discharger 11 removes the potential from the surface of the photosensitive sheet 1 just before transferring the toner image formed on the photosensitive sheet 1 onto an intermediate transfer sheet 18 which is a medium for composing images of respective colors. Basically, the pre-intermediate-transfer discharger 11 does not work at the transfer of a first color and works at the transfer of a second and subsequent colors. By executing the pre-intermediate-transfer discharging (i.e., removal of potential before the intermediate transfer), no toner image on the intermediate transfer sheet 18 is reversely transferred to the photosensitive sheet 1 even when the toner image is transferred to the intermediate transfer sheet 18 and no toner exists on the photosensitive sheet 1.

An intermediate transfer roller 12, which is provided close to a carrying roller 3 for the photosensitive sheet 1, makes contact with an inner surface of the intermediate transfer sheet 18. The intermediate transfer roller 12 is a metal roller and is disposed to oppose against the photosensitive sheet 1 with the intermediate transfer sheet 18 put therebetween. Since an aluminum-vapored-layer of the photosensitive sheet 1 is connected to the ground, an electric field is generated in a direction from the intermediate transfer roller 12 to the photosensitive sheet 1 when a positive potential is applied to the intermediate transfer roller 12. As a result, the Coulomb force acts on the negatively charged toner on the photosensitive sheet 1 toward the intermediate transfer sheet 18, and thereby the toner is transferred onto the intermediate transfer sheet 18.

The cleaning device 13, which is disposed to oppose against the carrying roller 4 with the photosensitive sheet 1 put therebetween, removes the toner which remains on the photosensitive sheet 1 after the transfer from the photosensitive sheet 1 to the intermediate transfer sheet 18. The commissure 7 of the photosensitive sheet 1 is obliquely disposed to have an angle of 3° to 5° with respect to a scanning direction of the exposure rays 15. Therefore, there is no confusion of the image caused by an impact at the passage of the commissure 7 over the cleaning device 13. The cleaning device 13 has no mechanism to move itself into and out of contact with the photosensitive sheet 1. The discharger 14 includes therein plural red LED (not shown) aligned on a straight line. The discharger 14 removes residual potential on the photosensitive sheet 1.

Next, configuration of periphery of the intermediate transfer sheet 18 will be described. The intermediate transfer sheet 18, which is made of conductive resin etc., is a loop-shaped belt without any commissure. The intermediate transfer sheet 18 is a medium to form a full-color image by synthesizing monochromatic images. The intermediate transfer sheet 18 is held by three carrying rollers 19, 20 and 21 and is driven by the same motor as that of the photosensitive sheet 1 to rotate clockwise as shown by an arrow d2. Eight position detection marks 22 are arranged at end portions of the intermediate transfer sheet 18. A position sensor 23 detects arrival of the position detection marks 22. To form an image, one of position detection marks 22 is selected as a reference point of the image formation.

Around the intermediate transfer sheet 18, a pre-transfer charger 24, a density sensor 25, a paper transfer roller 26 and a cleaning device 27 for the intermediate transfer sheet 18 are provided along the direction of the arrow d2.

The pre-transfer charger 24 is a known Corotron charger which is composed of a charging wire made of tungsten etc. and a shield board of metal. When a negative high voltage is applied to the charging wire, the charging wire causes corona discharge, thereby enforcing re-charging of the toner image synthesized on the intermediate transfer sheet 18. Re-charging of the toner image by the pre-transfer charger 24 is carried out only for an image region on the intermediate transfer sheet 18 at just before the transfer of the toner image to a paper 28 and not carried out during other periods. According to the charging before the transfer, mechanical margins and characteristic for environment are improved in transferring the toner image onto the paper 28.

A density sensor 25, which is an application of the reflection type sensor, detects a toner density on the intermediate transfer sheet 18. A luminous part of the density sensor 25 is connected with a D/A converter (shown later). By setting data to the D/A converter and controlling current, luminous quantity can be changed. An output from a light-receiving part of the density sensor 25 is amplified through an operational amplifier etc. and input to an A/D conversion port of the CPU, thus realizing a feedback control at the luminous part.

The paper transfer roller 26 is composed of a metal shaft (not shown) and foam silicone or conductive urethane rubber etc. which surrounds the metal shaft. The paper transfer roller 26 rotates and makes contact with the intermediate transfer sheet 18 at the time when the toner image synthesized on the intermediate transfer sheet 18 is transferred onto the paper 28. Since the image is deteriorated when the paper transfer roller 26 is polluted with the toner etc., the cleaning mechanism is arranged in the neighborhood.

A cleaning device 27 for the intermediate transfer sheet 18 is provided to remove the residual toner on the intermediate transfer sheet 18 after completion of the toner transfer to the paper 28. The cleaning device 27 is out of contact with the intermediate transfer sheet 18 while the toner image is synthesized on the intermediate transfer sheet 18. Only when the cleaning is carried out, the cleaning device is in contact with the intermediate transfer sheet 18.

A reference density sensor 29 is also provided around the intermediate transfer sheet 18. The reference density sensor 29 detects a density of a reference density correction board 39 having a predetermined reflectance. A luminous part of the reference density sensor 29 is connected in series with the luminous part of the density sensor 25. Therefore, a common current flows in both the luminous parts of the density sensor 25 and the reference density sensor 29. The reference density correction board 39 is of a substantially white color to obtain the maximum density reference of color component toner.

Next, paper feeding structure will be described.

A paper feeding system is composed of a paper cassette 30, paper feeding roller 31, a paper carrying passage 32, a slip roller 33, a resist roller 34a and a slave roller 34b.

The paper cassette 30 accommodates up to 100 sheets of the paper 28. In the periphery of the paper cassette 30, there are arranged several parts (not shown) such as a sensor for detecting the paper cassette 30, a sensor for detecting paper size, a sensor for detecting the paper 28 and a sensor for detecting amount of the paper 28.

The paper feeding roller 31, which is a semicircular roller, forwards the paper 28 one by one from the paper cassette 30 to the paper carrying passage 32.

The slip roller 33 is disposed at an intermediate part of the paper carrying passage 32. The paper 28 picked up by the paper feeding roller 31 is carried by the slip roller 33 toward the resist roller 34a. At the time when a head of the paper 28 reaches the resist roller 34a, both the resist roller 34a and the slave roller 34b have not yet been rotated so as to make a position of the paper 28 coincident with a position of the synthesized image on the intermediate transfer sheet 18. Therefore, the paper 28 can not go ahead and is slipping at a position of the slip roller 33.

When the position of the paper 28 is coincident with the position of the synthesized image on the intermediate transfer sheet 18, both the resist roller 34a and the slave roller 34b are rotated to move the paper toward the paper transfer roller 26.

Next, configuration of a fixing device 35 will be described.

The fixing device 35 is composed of a heat roller 36, a pressure roller 37 and a temperature sensor 38 etc.

The heat roller 36 is composed of a heater (not shown), an aluminum core (not shown) and a silicone rubber (not shown) approximately 0.5 mm thick surrounding the core. Surface of the toner image transferred onto the paper 28 is heated by the heat roller 36, and the toner is thereby softened and melted.

A pressure roller 37 consists of a steel core (not shown) and a silicone rubber (not shown) approximately 3 mm thick surrounding the core. The paper 28 is put between the pressure roller 37 and the heat roller 36 and is thereby pressurized and heated. Thus, the toner image on the paper 28 is fixed, and a color picture is formed on the paper 28.

The temperature sensor 38, which is typically a thermistor, detects a surface temperature of the heat roller 36. Detection of output from the temperature sensor 38 is executed at every suitable sampling cycle. Based on a result of detection, on-time-period of a heater (not shown) per a time unit is controlled to maintain a regulated temperature.

In general, an electrophotography made by the apparatus as mentioned above is highly dependent on change of environmental conditions. For instance, when the temperature within the electrophotography apparatus increases, gradation characteristic varies as time lapses. It is one of important technical subjects for the full-color type electrophotography apparatus to secure a gray balance when three primary colors (cyan, magenta and yellow) for printing are mixed with one another. Therefore, many trials and proposals have been made to secure the gray balance.

Hereafter, detailed description will be made about the conventional art on the density sensor 25 and the reference density sensor 29. Description about the whole configuration is made with reference to FIG. 12, and description about the operation of the sensors 25 and 29 is made with reference to FIG. 13. FIG. 13 is a block diagram showing an outline configuration of a part in the conventional electrophotography apparatus.

In FIG. 13, the density sensor 25 detects a density of a test pattern for correcting gradation including medium tone formed on the intermediate transfer sheet 18. The density sensor 25 also detects surface density of the intermediate transfer sheet 18.

The reference density correction board 39 is a white board having a predetermined reflectance. The reference density sensor 29 detects a density of the reference density correction board 39 and uses it as a dark reference. The dark reference, which is equal to the maximum density of color component toners (cyan, magenta, yellow), is used to normalize an output of the density sensor 25. As to the achromatic toner (black), a predetermined value of the dark reference is used, and a detection value of the reference density sensor 29 is not used.

The reason why the white board having comparatively high lightness is made by the dark reference for the chromatic components is described. In detection of the toner density with the reflective type sensor, the toner density is actually detected in the form of variation of reflectance. When the toner density of the chromatic components rises, the reflectance also increases. Since the dark reference regulates the upper limit of the color toner density, high reflectance, hence white, is preferable.

The dark reference for the achromatic toner should be detected with the reference density correction board of low reflectance (black) basically. However, black print parts in the full-color picture are basically made by the chromatic components (cyan, magenta and yellow), and the black toner is mainly used as a black printer to enhance contrast of the picture. It is therefore not required for the achromatic toner to have fine gradation characteristic as required for the chromatic components. The dark reference for the achromatic component is defined zero of reflectance accordingly.

Both the density sensor 25 and the reference density sensor 29 are of the same type reflective type sensor. A CPU 40 makes numerical control for a D/A converter 41, thereby varying a current of luminous part of the reflective type sensor. Light-quantity control is thus realized. 6-bit data, namely, values of 0–63 can be set to the D/A converter 41. Luminous parts of the density sensor 25 and the reference density sensor 29 are electrically connected in series with each other, and they are driven with a common current. Therefore, quantities of light in respective sensors 25 and 29 are substantially equal to each other. Since both outputs of the sensors 25 and 29 are input to an A/D conversion port of the CPU 40, the CPU can always refer to the outputs of the density sensor 25 and the reference density sensor 29.

In the above-mentioned conventional electrophotography apparatus, gradation correction is carried out at an initializing state of closing a power source.

Hereafter, operation of the gradation correction in the conventional apparatus will be described.

In a first stage of the gradation correction, quantities of light at the luminous part of the density sensor 25 is determined for the chromatic components (cyan, magenta and yellow) and the achromatic component (black).

When quantities of light different from each other are respectively determined for the chromatic components and the achromatic component, a second stage of the gradation correction begins. In the second stage, quantity of light of the density sensor 25 is selectably changed in accordance with two setting states of the chromatic components detection and the achromatic component detection. A surface density of the intermediate transfer sheet 18 is thus detected.

First, rotation of the exposure optical system 9 is started. The photosensitive sheet 1 and the intermediate transfer sheet 18 are rotated in the directions of the arrows d1 and d2, respectively. Further, in the development devices 10K, 10Y, 10M and 10C, rotation of the respective sleeve rollers 16K, 16Y, 16M and 16C are started.

When the respective drive sources are thus started, the charging wire in the charger 8 connected to the high voltage power source is impressed with a high voltage approximately from −4000 V to −5000 V, thereby causing the corona discharge. Further, a voltage of −700 V is applied to the grid of the charger 8, thereby charging the whole surface of the photosensitive sheet 1 with an even voltage of about −700 V. The discharger 14 is also operated, and a high voltage about +1000 V is applied to the intermediate transfer sheet 12.

When a carrying speed of the intermediate transfer sheet 18 and the photosensitive sheet 1 reach a predetermined value, the position detection sensors 6 and 23 begin to detect the position detection marks 5 and 22, respectively. Based on a difference of detection time between these two marks 5 and 22, a control part, which controls the whole of the electrophotography apparatus, controls the electrophotography apparatus to avoid the commissure 7 of the photosensitive sheet 1 and selects the detection mark 22 by which a picture can be formed within the shortest time. Further, the control part calculates a delay time of the actual start of the picture formation process from the instance of detection of the position detection mark 22. In the subsequent picture formation processes, the position detection mark 22 selected at this time is utilized as a reference of starting the picture formation for all colors.

When the position detection mark 22 selected through the above-mentioned procedure is detected by the position detection sensor 23, the CPU 40 sets the D/A converter 41 with a quantity of light (hereinafter is referred to as "light quantity") necessary for reading the chromatic components and starts reading of an output of the density sensor 25. The output of the density sensor 25 is taken in the CPU 40 at every predetermined sampling cycle. The CPU 40 immediately stores a read-in result in a RAM 42. For example, a picture region of the intermediate transfer sheet 18 is 370 mm; a carrying speed is 100 mm/s; and a sampling cycle is 10 ms. Then, data of 370 pieces are stored in the RAM 42 during one rotation of the intermediate transfer sheet 18.

When the detection of the surface density for the intermediate transfer sheet 18 is completed under the light quantity for the chromatic components, the CPU 40 sets the D/A converter 41 with the light quantity of the density sensor 25 at the time of measurement for achromatic components, and the CPU 40 waits for detection of the selected position detection sensor 22 by the position detection sensor 23. When the position detection mark 22 is detected by the position detection sensor 23, the CPU 40 measures the surface density of the intermediate transfer sheet 18 under the light quantity for the achromatic components in the similar way to the measurement in the chromatic components. The CPU 40 stores a result in the RAM 42. When the measurement of surface density of the intermediate transfer sheet 18 is completed under the light quantity for the achromatic components, the second stage of the gradation correction is completed.

When the second stage is completed, the third stage is started. The third stage is to detect the density of a test pattern of the gradation correction formed on the intermediate transfer sheet 18.

First, a method for forming the test pattern for the gradation correction will be described. After the predetermined time lapses from the time when the position detection mark 22 selected in the second stage of the gradation correction is detected by the position detection sensor 23, a latent image of the test pattern for the gradation correction is formed on the photosensitive sheet 1 with reference to the density data stored in the electrophotography apparatus. This latent image is developed by touching the photosensitive sheet 1 with the black development device 10K. The developed black test pattern for the gradation correction is transferred to the intermediate transfer sheet 18 and is carried to the density sensor 25.

Further, after a predetermined time lapses, the CPU 40 sets the D/A converter 41 with a light quantity necessary for reading the achromatic components, and the CPU 40 starts reading an output of the density sensor 25. The output of the density sensor 25 is taken into the CPU at every predetermined sampling cycle. This read-in operation is executed for all the picture area, and the CPU 40 immediately stores a read-in result in the RAM 42.

When the density measurement of the gradation correction test pattern for the achromatic components is completed as described above, the CPU 40 sets the D/A converter 41 with the light quantity for reading the chromatic components. The CPU 40 waits for secondary detection of the position detection mark 22 selected at the second stage of the gradation correction by the position detection sensor 23. After that, by utilizing the gradation correction test pattern same as black, density measurements for cyan, magenta and yellow are carried out. The CPU 40 stores measuring results in the RAM 42 in the way similar to the black.

In the above-mentioned operation, what is stored in the RAM 42 is: the surface density for the intermediate transfer sheet 18 under the light quantity for the achromatic components; the density detection result of the gradation correction test pattern for the achromatic components; the surface density of the intermediate transfer sheet 18 under the light quantity for the chromatic components; and the respective density detection results of the gradation correction test patterns for cyan, magenta and yellow. However, these data have been derived by merely storing the output of the density sensor 25 in the time order. Therefore, when formation and reading-in of the gradation correction test pattern is completed, operation of each motor and the charger 8 etc. in the electrophotography apparatus are stopped, and thereafter it is necessary to execute data processing.

Since all the data stored in the RAM 42 is based on the identical detection of the position detection mark 22, a start point of reading in for the surface density and the gradation correction test pattern is always an identical point on the intermediate transfer sheet 18. Since a time period from the detection of the position detection mark 22 till the CPU 40 starts reading the output of the density sensor 25 is fixed, it is easy to obtain the density data corresponding to respective positions of the gradation correction test pattern. For instance, measurement values of 8 points per one gradation correction test pattern are summed up, and a mean value of these measurement values is handled as a density value of one pattern. Thus, under the light quantity for the achromatic components, the surface density of the position of each pattern and the toner density are obtained. Also, under the light quantity for the chromatic components, the surface density of the position of each pattern and the toner densities of cyan, magenta and yellow are obtained.

Hereupon, the surface density of the intermediate transfer sheet 18 is of a density level having no toner on the intermediate transfer sheet 18. This is a white part on the paper 28. This is a reference of highlight.

As to a dark reference, reading-in is only once executed after completion of reading the gradation correction test pattern, and the dark read-out data is stored by the CPU 40 in the RAM 42 as the dark reference. This is because the reference density correction board 39 is fixed and is hardly influenced by the external state.

Next, data processing for black (achromatic component) and cyan (chromatic component) will be described. Since the data processing for magenta or yellow is the same as cyan, description about magenta and yellow is omitted. In the following description, when a position of each pattern is represented by n (n=0, 1, 2, . . . , 9), the surface density of black at the position n is represented as HL_K[n], and the surface density of cyan at the position n is represented as HL_CMY[n]. The letter HL means highlight, and the letter CMY means to be common highlight reference of cyan, magenta and yellow. Toner densities for the gradation correction test pattern is represented as D_C[n] for cyan and D_K[n] for black. The dark reference for cyan is represented as DK_CMY. First, the data processing for black will be described. FIG. 14 is a graph showing a relation between the density measurement result for each pattern of black and the reference of highlight and the data processing.

The data processing of black is carried out by utilizing the density data D_K[n] for each pattern and the highlight reference HL__K[n]. As to the dark reference, a value derived from the reference density correction board 39 is not used, but an imaginary value (0) is used.

As to respective values of n, the following calculation is carried out:

$$DIF[n]=HL\_K[n]-D\_K[n],$$

wherein a true density level is represented as DIF[n].

Since the dark reference of black represented by a line 48 is zero, the maximum value of the surface density represented by a dotted line 47 is made a dynamic range DL.

Next, the true density level DIF[n] is normalized with 8-bit against the dynamic range DL. That is, calculation of a normalized value NM[n] is calculated per every pattern with the following equation:

$$NM[n]=DIF[n]\times 255/DL.$$

Next, the data processing for cyan will be described. FIG. 15 is a graph showing the density measurement result for each pattern of cyan, a relation between the highlight reference and the dark difference and the data processing in accordance with the conventional electrophotography apparatus.

In the data processing for cyan, the density data D__C[n] for each pattern, the highlight reference HL__CMY[n] and the dark reference represented by a dotted line 49 (DK__CMY) are used. A read-out value of the reference density correction board 39 with the reference density sensor 29 is used for the dark reference DK__CMY.

As to respective values n, the following calculation is carried out:

$$DIF[n]=D\_C[n]-HL\_CMY[n].$$

Further, the following calculation is carried out:

$$DL=DK\_CMY-SD.$$

In this equation, a letter SD means the minimum value of the surface density which is shown by a dotted line 50.

Next, the density level DIF[n] is normalized with 8-bit against the dynamic range DL. This is, for every pattern, the normalized value NM[n] is calculated by:

$$NM[n]=DIF[n]\times 255/DL.$$

The data of the gradation correction test pattern, hence the input, has a predetermined known value. A relation between this input data and the normalized value obtained as above-mentioned brings the γ characteristic of the electrophotography apparatus.

Therefore, when a relation between the input data and the normalized value is obtained, a gradation correction table which is a reverse function of the γ characteristic is obtained.

In the above-mentioned conventional electrophotography apparatus described throughout the foregoing pages, there are the following shortcomings.

In making the gradation correction table, the CPU 40 reads the gradation correction test pattern via the density sensor 25, and this read-in data is normalized by making a difference between the highlight reference read by the density sensor 25 and the dark reference read by the reference density sensor 29 a dynamic range in case of the chromatic components. To detect the density of the gradation correction test pattern with the above-mentioned method, the outputs of the two sensors must be equal to each other as a precondition when the two sensors detect an identical object. In other words, when the density sensor 25 detects the pattern having a reflectance equal to that of reference density correction board 39, the output of the density sensor 25 must be equal to an output at the time when the reference density sensor 29 detects the reference density correction board 39.

However, if there is an error in positioning of the density sensor 25 or the reference density sensor 29, respective outputs of the sensors 25 and 29 are not equal to each other. Therefore, strict positioning for the respective sensors 25 and 29 and an electrical adjustment are indispensable.

Concretely, a predetermined value is set in the D/A converter 41, and an electric gain is adjusted so that an output value of the reference density sensor 29 may be a predetermined value. Further, the gain and a position of the density sensor 25 are adjusted so that the output of the density sensor 25 against the surface density of the intermediate transfer sheet 18 may be a predetermined value.

However, it is a troublesome and time-consuming work to make this adjustment. Further, there is a problem that a re-adjustment is necessary at every time for exchange of the intermediate transfer sheet 18 which is consumer goods.

Moreover, when the surface of the density sensor 25 is polluted with toner etc. or when the fixed positions of the sensors are slightly shifted from the correct position for some reason, detection of the correct density is not possible, and a considerable deterioration is made in the image quality.

Furthermore, the reference density correction board 39 serves as the dark reference for the chromatic components, whereas the imaginary value is used for the dark reference against the black toner. An accuracy for detecting the density is therefore bad. Even if the correction board having a low reflectance is used to improve the accuracy, a sensor and peripheral circuits therefor are additionally required, thus resulting in undesirable increase of costs.

OBJECT AND SUMMARY OF THE INVENTION

An object of the present invention is to offer an electrophotography apparatus capable of having an excellent image quality by providing the optimum gradation correction.

In order to achieve the above-mentioned object, the electrophotography apparatus of the present invention comprises:

latent image formation means for forming a latent image on a photosensitive member;

development means for developing the latent image to a toner image with toner;

transfer means for transferring the toner image onto a transfer member;

density detection means for detecting a density of a toner image transferred onto the transfer member; and gradation correction means for correcting gradation by referring to an output value of the density detection means at an instance when the density detection means detects the toner image of saturation density transferred onto the transfer member.

According to the present invention, the dark reference, the highlight reference and the gradation correction pattern transferred onto the transfer member are measured by only one sensor. Therefore, even if the position of the sensor is deviated from the correct position or even if the surface of the sensor is polluted with toner, a relation between the dark reference and the gradation correction pattern is kept constant.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF THE DRAWINGS

FIG. 1 is an illustration showing a configuration of the electrophotography apparatus;

FIG. 2 is a block diagram showing peripheral circuits of a density sensor in the electrophotography apparatus;

FIG. 3 is a graph showing luminous quantity adjustment for the density sensor;

FIG. 4 is an illustration showing a gradation correction test pattern for detecting a saturation density;

FIG. 5 is a graph showing a test pattern for gradation correction;

FIG. 6 is a graph showing an output of the density sensor against the gradation correction test pattern of chromatic components and an achromatic component;

FIG. 7 is a graph showing a relation among density measurement results of black, a highlight reference and a dark reference and a data processing;

FIG. 8 is a graph plotted with a density conversion table for black;

FIG. 9 is a graph showing density measurement results of each pattern for cyan;

FIG. 10 is a graph plotted with a density conversion table for cyan;

FIG. 11 is a block diagram showing a circuit configuration for processing image data with the gradation correction table;

It will be recognized that some of the figures are schematic representations for purposes of illustration and do not necessarily depict the actual relative sizes or locations of the elements shown.

DESCRIPTION OF THE PREFERRED EMBODIMENT

Hereafter, a preferred embodiment of the present invention will be described with reference to the accompanying drawings.

Figure 1:
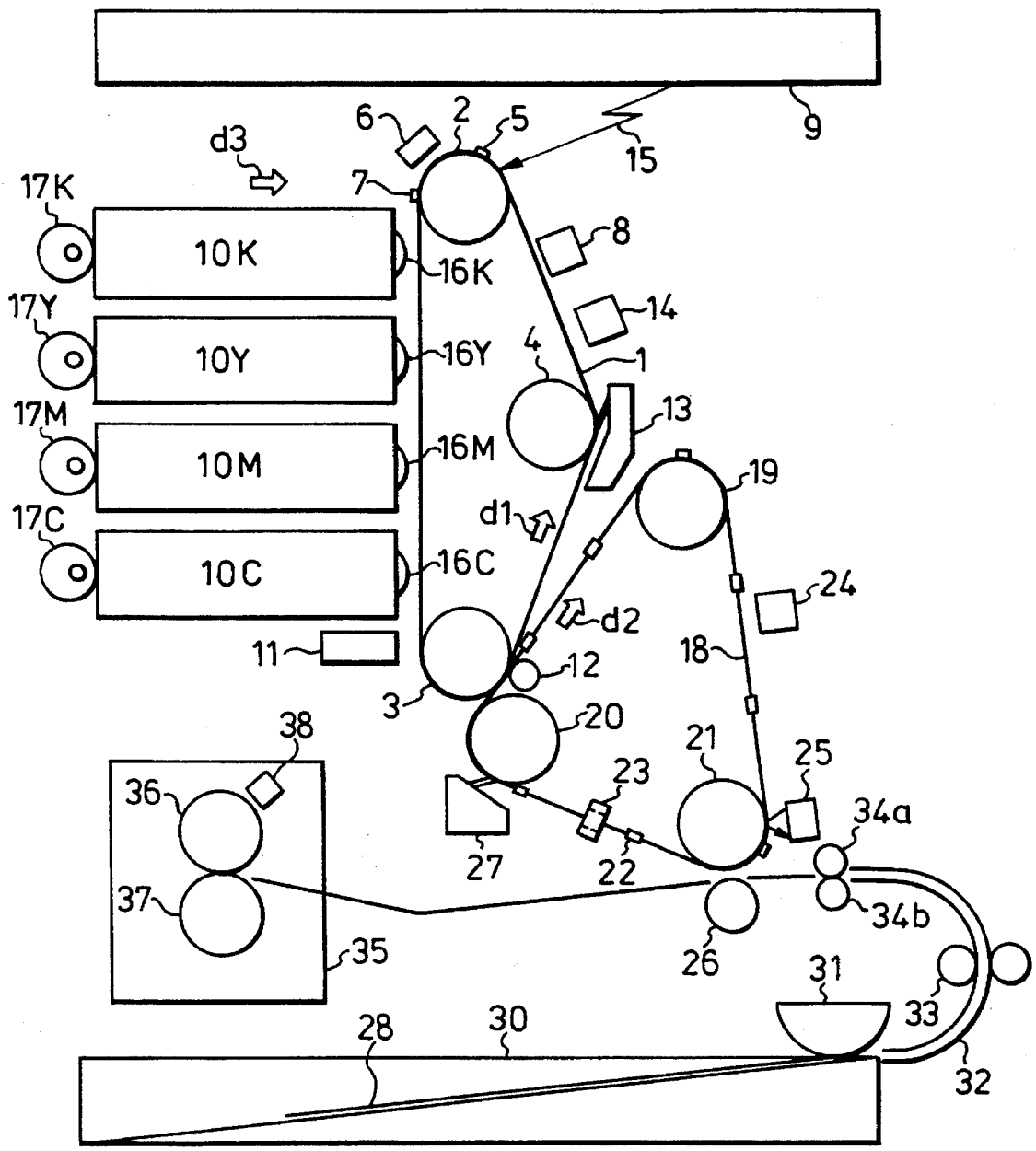
FIGS. 1 through 11 refer to an electrophotography device of an embodiment in the present invention.

FIG. 1 is an illustration showing a configuration of an electrophotography apparatus of an embodiment of the present invention.

CONFIGURATION AROUND A PHOTOSENSITIVE SHEET

A photosensitive sheet 1 of loop-belt-type is composed of a polyethylene terephthalate (PET) substrate, an aluminum evaporation layer, a charge generation layer (CGL) and a charge transfer layer (CTL). The photosensitive sheet 1 is held by three carrying rollers 2, 3 and 4. The photosensitive sheet 1 moves in a direction of arrow d1 by a driving source such as a motor (not shown). A position detection mark 5 for detecting arrival of a specific position of the photosensitive sheet 1 is arranged at an edge part of the photosensitive sheet 1. A position detection sensor 6 for detecting the position detection mark 5 is provided beside the roller 2. The photosensitive sheet 1 has a commissure 7. The commissure 7 must be stayed always outside the image projected on the photosensitive sheet 1 by referring to an output of the position sensor 6.

Around the photosensitive sheet 1, a charger 8, an exposure optical system 9, development devices 10K, 10Y, 10M and 10C for black, yellow, magenta and cyan, respectively, a pre-intermediate-transfer discharger 11, an intermediate transfer roller 12, a cleaning device 13 for the photosensitive sheet 1, and a discharger 14 are provided along the direction of the arrow d1.

The charger 8 is composed of a charging wire made of tungsten etc., a shield board of metal and a grid etc. (these parts are not shown). When a negative high voltage is applied to the charging wire, the charging wire causes corona discharge. For instance, when a voltage of −700 V is applied to the grid, a surface of the photosensitive sheet 1 is evenly charged with about a negative potential of −700 V.

The exposure optical system 9 is composed of a laser drive unit, a polygon mirror, a motor for rotating the polygon mirror and a lens system etc. (illustration of these parts is omitted). Exposure rays 15 irradiated from the exposure optical system 9 form on the photosensitive sheet 1 an electrostatic latent image corresponding to image data of specific color. The exposure rays 15 are obtained by modulating pulse-width of the image signal, which is issued from a gradation conversion device etc., with the laser drive circuit.

The development devices 10K, 10Y, 10M and 10C include toner of black, yellow, magenta and cyan, respectively, and they have sleeve rollers 16K, 16Y, 16M and 16C made of conductive rubber etc., respectively. When the sleeve rollers 16K, 16Y, 16M and 16C are rotated clockwise along the direction of the arrow d1, the toner is supplied in the form of thin film from the development devices 10K, 10Y, 10M and 10C to surfaces of the sleeve rollers 16K, 16Y, 16M and 16C, respectively. In a process of forming the toner into a thin film, the toner is charged with negative potential due to friction. The sleeve rollers 16K, 16Y, 16M and 16C are impressed with a negative voltage (developing bias) and rotated. Cams 17K, 17Y, 17M and 17C are driven by motors (not shown) to move the development devices 10K, 10Y, 10M and 10C in a direction of an arrow d3, respectively. For instance, when the cam 17K is driven to thereby push the development device 10K rightward (direction of d3), the sleeve roller 16K makes contact with the photosensitive sheet 1. That is, a contact development method is employed by utilizing a nonmagnetic single-component toner.

A surface potential (bright potential) of a part of the photosensitive sheet 1 on which the latent image is formed is approximately from −50 to −100 V. By impressing the sleeve roller 16K with a negative voltage about −300 V, an electric field is generated in a direction from the photosensitive sheet 1 to the sleeve roller 16K. As a result, the Coulomb force acts on the negatively charged toner on the sleeve roller 16K in a direction reverse to the direction of electric field. Therefore, the toner is attracted to the photosensitive sheet 1 and is attached on the latent image formed on the photosensitive sheet 1. A surface potential (dark potential) of a part of the photosensitive sheet 1 on which no latent image is formed is −700 V. Therefore, when the development bias is applied to it, an electric field is generated in a direction from the sleeve roller 16K to the photosensitive sheet 1. As a result, no toner is attached onto the photosensitive sheet 1. As has been described above, a toner image is formed by the development through the negative-positive process.

The pre-intermediate-transfer discharger 11 includes therein plural red LED (not shown) aligned on a straight line. The pre-intermediate-transfer discharger 11 removes the potential from the surface of the photosensitive sheet 1 just before transferring the toner image formed on the photosensitive sheet 1 onto an intermediate transfer sheet 18 which is a medium for composing images of respective colors. Basically, the pre-intermediate-transfer discharger 11 does not work at the transfer of a first color and works at the transfer of a second and subsequent colors. By executing the pre-intermediate-transfer discharging (i.e., removal of potential before the intermediate transfer), no toner image on the intermediate transfer sheet 18 is reversely transferred to the photosensitive sheet 1, even in case the toner image is transferred to the intermediate transfer sheet 18 and no toner exists on the photosensitive sheet 1.

Hereinafter, occurrence of the reverse transfer will be described. In case where the toner image exists on the intermediate transfer sheet 18 and no toner exists on the photosensitive sheet 1, the toner existing on the intermediate transfer sheet 18 is exposed to an excessively intensive electric field formed by a transfer bias given by the intermediate transfer roller 12 and a surface potential of the photosensitive sheet 1 as mentioned later. The toner is thereby deprived of its true electric charge, and the charge injection occurs. As a result, Van der Waals force acts between the toner and the photosensitive sheet 1. Therefore, the toner is reversely transferred to the photosensitive sheet 1, and the reverse charged toner (i.e., positively charged toner) is generated and thereby reversely transferred to the photosensitive sheet 1 with the Coulomb force.

On the other hand, when the discharging before transfer is carried out, a part on which no toner exists has the bright potential. Therefore, it is prevented that the excessive electric field acts on the toner, and the reverse transfer is thereby prevented effectively. However, when the discharging is effected too much, a potential barrier of toner-less part around the dots is lost, thereby weakening a force restricting the toner toward the surface of the photosensitive sheet 1. As a result, the dots are scattered away at the time of transfer. It is thus understood that the light quantity of the pre-intermediate-transfer discharger 11 should be strictly controlled.

The intermediate transfer roller 12, which is provided close to a carrying roller 3 for the photosensitive sheet 1, makes contact with an inner surface of the intermediate transfer sheet 18. The intermediate transfer roller 12 is a metal roller and is disposed to oppose against the photosensitive sheet 1 with the intermediate transfer sheet 18 put therebetween. Since an aluminum-vapored-layer of the photosensitive sheet 1 is connected to the ground, an electric field is generated in a direction from the intermediate transfer roller 12 to the photosensitive sheet 1 when a positive potential is applied to the intermediate transfer roller 12. As a result, the Coulomb force acts on the negatively charged toner on the photosensitive sheet 1 toward the intermediate transfer sheet 18, and thereby the toner is transferred onto the intermediate transfer sheet 18.

The cleaning device 13, which is disposed to oppose against the carrying roller 4 with the photosensitive sheet 1 put therebetween, removes the toner which remains on the photosensitive sheet 1 after the transfer from the photosensitive sheet 1 to the intermediate transfer sheet 18. The commissure 7 of the photosensitive sheet 1 is obliquely disposed to have an angle of 3° to 5° with respect to a scanning direction of the exposure rays 15. Therefore, there is no confusion of the image caused by an impact at the passage of the commissure 7 over the cleaning device 13. The cleaning device 13 has no mechanism to move itself into and out of contact with the photosensitive sheet 1. The discharger 14 includes therein plural red LED (not shown) aligned on a straight line. The discharger 14 removes residual potential on the photosensitive sheet 1.

CONFIGURATION AROUND THE INTERMEDIATE TRANSFER SHEET

Next, configuration of periphery of the intermediate transfer sheet 18 will be described. The intermediate transfer sheet 18, which is made of conductive resin etc., is a loop-shaped belt without any commissure. The intermediate transfer sheet 18 is a medium to form a full-color image by synthesizing monochromatic images. The intermediate transfer sheet 18 is held by three carrying rollers 19, 20 and 21 and is driven by the same motor as that of the photosensitive sheet 1 to rotate clockwise as shown by an arrow d2. Eight position detection marks 22 are arranged at end portions of the intermediate transfer sheet 18. A position sensor 23 detects arrival of the position detection marks 22. To form an image, one of position detection marks 22 is selected as a reference point of the image formation.

Hereafter, a method to determine the reference for image formation will be described. In the configuration shown in FIG. 1, circumferential lengths of the photosensitive sheet 1 and the intermediate transfer sheet 18 are made substantially equal to each other. However, they are not perfectly equal to each other. Respective rotation cycles are therefore not equal to each other. When the position detection mark 5 is selected as a reference for the image formation, the toner image is always formed on the same position on the photosensitive sheet 1, whereas the toner images of respective colors are formed on the intermediate transfer sheet 18 with a minute position shift from one another. On the other hand, when the image formation reference is obtained from the intermediate transfer sheet 18, a position of the image formation on the photosensitive sheet 1 gradually shifts in response to a difference of the circumferential length, whereas the synthesized image is formed on the same position on the intermediate transfer sheet 18. Therefore, the image formation reference must be based on the intermediate transfer sheet 18. However, there is the commissure 7 on the photosensitive sheet 1, and it is impossible to form the toner image on the commissure 7. As a result, even if a proper image formation position is found on a certain position of the intermediate transfer sheet 18, it may be impossible to enter into the image formation operation.

For the above-mentioned reason, plural position detection mark 22 are provided at end parts of the intermediate transfer sheet 18, and the position detection mark 22 just before the detection of the position detection mark 5 is selected as the image formation reference. Further, a time period from the detection of the position detection mark 22 till the detection of the position detection mark 5 is measured as a phase difference time period. After the detection of the selected position detection mark 22, all the image formation processes are delayed by the phase difference time period.

In principle, there is no problem that the number of the position detection mark 22 is only one. However, in some positional relation between the photosensitive sheet 1 and the intermediate transfer sheet 18, first printing may be delayed, or it takes a long time to start the image formation from the detection of the position detection mark 22, thereby lowering a preciseness of image positioning on the intermediate transfer sheet 18. Therefore, plural position detection mark 22 are arranged on the intermediate transfer sheet 18 so that the image formation can be started soon after the detection of the position detection mark 22.

Around the intermediate transfer sheet 18, a pre-transfer charger 24, a density sensor 25, paper transfer roller 26 and a cleaning device 27 for the intermediate transfer sheet 18 are provided along the direction of the arrow d2.

The pre-transfer charger 24 is a Corotron charger which is composed of a charging wire (not shown) made of tungsten etc. and a shield board (not shown) of metal. When a negative high voltage is applied to the charging wire, the charging wire causes corona discharge, thereby enforcing re-charging of the toner image synthesized on the intermediate transfer sheet 18. Re-charging of the toner image by the pre-transfer charger 24 is carried out only for an image region on the intermediate transfer sheet 18 at just before the transfer of the toner image to a paper 28 and not carried out during other periods. According to the charging before the transfer, transfer of the toner image onto the paper 28 is carried out well.

A density sensor 25, which is an application of the reflection type sensor, detects a toner density on the intermediate transfer sheet 18. A luminous part of the density sensor 25 is connected with a D/A converter (shown later). By setting data to the D/A converter and controlling current, light quantity can be changed. An output of a light-receiving part of the density sensor 25 is amplified through an operational amplifier (shown later) etc. and input to an A/D conversion port of the CPU, thus realizing a feedback control at the luminous part.

The paper transfer roller 26 is composed of a metal shaft (not shown) and foam silicon or conductive urethane rubber etc. which surrounds the metal shaft. The paper transfer roller 26 rotates and makes contact with the intermediate transfer sheet 18 at the time when the toner image synthesized on the intermediate transfer sheet 18 is being transferred onto the paper 28. Since the image is deteriorated when the paper transfer roller 26 is polluted with the toner etc., the cleaning mechanism (not shown) is arranged in the neighborhood.

A cleaning device 27 for the intermediate transfer sheet 18 is provided to remove the residual toner on the intermediate transfer sheet 18 after completion of the transfer to the paper 28. The cleaning device 27 is out of contact with the intermediate transfer sheet 18 while the toner image is being synthesized on the intermediate transfer sheet 18. Only when the cleaning is being carried out, the cleaning device is in contact with the intermediate transfer sheet 18.

CONFIGURATION OF A PAPER FEEDING SYSTEM

Next, paper feeding structure will be described.

A paper feeding system is composed of a paper cassette 30, a paper feeding roller 31, a paper carrying passage 32, a slip roller 33, a resist roller 34a and a slave roller 34b.

The paper cassette 30 accommodates up to 100 sheets of the paper 28. In the periphery of the paper cassette 30, several parts (not shown) such as a sensor for detecting the paper cassette 30, a sensor for detecting paper size, a sensor for detecting the paper 28 and a sensor for detecting amount of the paper 28 are arranged.

The paper feeding roller 31, which is a semicircular roller, forwards the paper 28 one by one from the paper cassette 30 to the paper carrying passage 32.

The slip roller 33 is disposed at an intermediate part of the paper carrying passage 32. The paper 28 picked up by the paper feeding roller 31 is carried by the slip roller 33 toward the resist roller 34a. At the time when a head of the paper 28 reaches the resist roller 34a, both the resist roller 34a and the slave roller 34b have not yet been rotated so as to make a position of the paper 28 coincident with a position of the synthesized image on the intermediate transfer sheet 18. Therefore, the paper 28 can not go ahead and is slipping at a position of the slip roller 33.

When the position of the paper 28 is coincident with the position of the synthesized image on the intermediate transfer sheet 18, both the resist roller 34a and the slave roller 34b are rotated to move the paper 28 toward the paper transfer roller 26.

CONFIGURATION OF A FIXING DEVICE

Next, configuration of a fixing device 35 will be described..

The fixing device 35 is composed of a heat roller 36, a pressure roller 37 and a temperature sensor 38 etc.

The heat roller 36 is composed of a heater (not shown), an aluminum core (not shown) and a silicone rubber (not shown) approximately 0.5 mm thick surrounding the core. Surface of the toner image transferred onto the paper 28 is heated by the heat roller 36, and the toner is thereby softened and melted.

A pressure roller 37 consists of a steel core (not shown) and a silicone rubber (not shown) approximately 3 mm thick surrounding the core. The paper 28 is put between the pressure roller 37 and the heat roller 36, which are rotating, and is thereby pressurized and heated. Thus, the toner image on the paper 28 is fixed, and a color picture is formed on the paper 28.

A temperature sensor 38, which is typically a thermistor, detects a surface temperature of the heat roller 36. An output from the temperature sensor 38 is detected at every suitable sampling cycle. Based on a result of detection, on-time-period of a heater (not shown) per a time unit is controlled to maintain a regulated temperature.

DETAILED DESCRIPTION ABOUT THE DENSITY SENSOR ETC.

Figure 2:
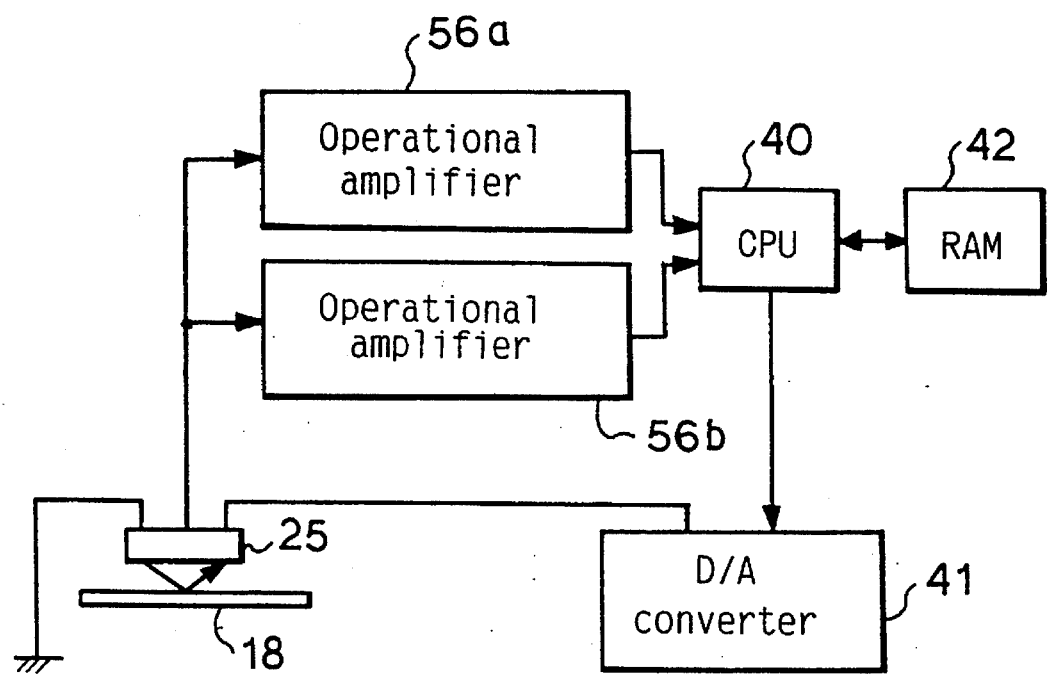

Hereafter, detailed description will be made about the density sensor 25 and its peripheral parts. Description about the whole configuration is made with reference to FIG. 1, and description around the sensor 25 is made with reference to FIG. 2. FIG. 2 is a block diagram showing the density sensor 25 and its peripheral circuits. The peripheral circuits are composed of operational amplifiers 56a and 56b, a CPU 40, a D/A converter 41 and a RAM 42.

The density sensor 25 are of the reflective type sensor disposed to face the intermediate transfer sheet 18. The CPU 40 makes numerical control for the D/A converter 41, thereby varying a current of luminous part of the reflective type sensor. Light quantity control is thus realized. 6-bit data, namely values of 0–63, can be set to the D/A converter 41.

An output signal of the density sensor 25 is input to the operational amplifiers 56a and 56b. A ratio of a gain of the operational amplifier 56a versus a gain of the operational amplifier 56b is made (1/2):1.

Output signals of the operational amplifiers 56a and 56b are input to respective A/D conversion ports of the CPU 40. Thus, the CPU 40 receives from the density sensor 25 two output signals having been processed with the gains different from each other.

INITIALIZING OPERATION

Now, initializing operation is described in detail.

When the power is supplied to the electrophotography apparatus, initial check works are carried out. For example, a check of the hardware such as the memory is carried out, and a check is carried out whether the parts necessary for the image formation such as the development devices 10K, 10Y, 10M, 10C, the fixing device 35 and the photosensitive sheet 1 are correctly mounted. Further, a check is carried out whether detection of initial jam etc. is detected or not. If nothing wrong is found, the heater of the heat roller 36 in the fixing device 35 is switched on, and the electrophotography device waits for a temperature of the heat roller to get at the predetermined value. This predetermined temperature is a temperature of about 100° C. at which the toner begins to become softened. When a surface temperature of the heat roller 36 reaches the predetermined value, the initializing operation is started.

In the initializing operation, a main motor for driving the photosensitive sheet 1 and the intermediate transfer sheet 18, a motor for driving the sleeve rollers 16K, 16Y, 16M and 16C, a scanner motor for revolving the polygon mirror in the exposure optical system 9 and a motor for carrying the paper 28 are started. Further, it is confirmed whether a normal operation is carried out in a servo system. Next, with at least the main motor driven, the charger 8 and the discharger 14 are started, thereby starting the initialization of the surface potential of the photosensitive sheet 1.

Next, positions of the respective parts are confirmed. First, positions of the development devices 10K, 10Y, 10M and 10C are confirmed. If the development device 10K is in a development position, the cam 17K is driven by the motor to restore the development device 10K to the home position. Subsequently, position of the paper transfer roller 26 is confirmed, and if it is in a paper transfer position, restoring of it to the home position is carried out. Further, position of the cleaning device 27 is confirmed. If the cleaning device 27 is out of contact with the intermediate transfer sheet 18, the cleaning device 27 is moved to be in contact with the intermediate transfer sheet 18. The cleaning device 27 is generally in contact with the intermediate transfer sheet 18 to thereby clean it, and the cleaning device 27 is out of contact with the intermediate transfer sheet 18 only for a while the toner image is being synthesized. In these processes, when the restoring operation is not carried out normally though the parts are commanded to restore themselves to the home position, the initializing operation in the electrophotography apparatus is stopped, and error messages are displayed on a display panel etc.

Next, initialization of the development devices 10K, 10Y, 10M and 10C are carried out. First, the cam 17C is rotated by 180°, thereby moving the development device 10C toward the direction shown by the arrow d3. Upon confirmation of the settlement of the development device 10C in the development position, the sleeve roller 16C is rotated. At that time, since the developing bias is not applied, no toner is attached on the photosensitive sheet 1. Next, the development device 10C is subjected to the detection of the toner remainder at the development position. The development device 10C has clear lenses fixed on both sides thereof. Through these lenses, an external light emitted from a luminous element (not shown) enters the development device 10C. This light is detected by a light receiver element (not shown) arranged opposite to the luminous element, and thereby lack of the toner in the development device 10C is detected. These luminous element and light receiver element are aligned on a straight optical axis line and are arranged so that the optical axis can pass through the lenses at the time when the development device 10C is in the development position. In the development device 10C, the lenses are cleaned cyclically with a wiper provided in a toner stirring device (not shown), thereby preventing the lenses from being soiled. Since the cleaning device is linked with the driving source of the sleeve roller 16C, it is necessary for detection of the toner remainder to rotate the sleeve roller 16C. Besides, the structure for detecting the toner remainder also serves to detect the development device 10C itself when the development device 10C is located in the home position.

After the rotation of the sleeve roller 16C for a predetermined while, when there is no problem in a detection result of the toner remainder, the cam 17C are rotated again by 180°. As a result, the development device 10C is restored to the home position, thus completing the initialization for the development device 10C.

Subsequently, initialization of the development devices 10M, 10Y and 10K are carried out in this sequential order. The reason why the initialization of the development devices 10C, 10M, 10Y and 10K are executed in this sequential order is based on the following facts: That is, the photosensitive sheet 1 is driven toward the direction shown by the arrow d1. Therefore, if the initialization is not executed in the above-mentioned order, there is a fear that the toner causes mixture of color in case the high voltage source causes malfunction. Accordingly, order of the initialization is made reverse to the direction to which the photosensitive sheet 1 is driven.

When initialization of all the development devices 10K, 10Y, 10M and 10C are completed, driving sources except the paper carrying motor which is the driving source of the heat roller 36 are stopped, and both the charger 8 and the discharger 14 are switched off. Further, warm-up operation is carried out until a temperature of the heat roller 36 in the fixing device 35 rises up to the predetermined temperature enabling the heat roller 36 to enter the fixing process. Gradation correction is carried out during this warm-up period.

OPERATION OF GRADATION CORRECTION

Hereafter, operation of the gradation correction will be described.

First Stage

When it has started warming up, the main motor is driven again on condition that the charger 8 etc. is not impressed with high voltage. By rotation of the main motor, a speed of the intermediate transfer sheet 18 and the photosensitive sheet 1 reaches a predetermined value soon. Thereafter, the intermediate transfer sheet 18 makes at least one turn, thereby cleaning itself.

Figure 3:
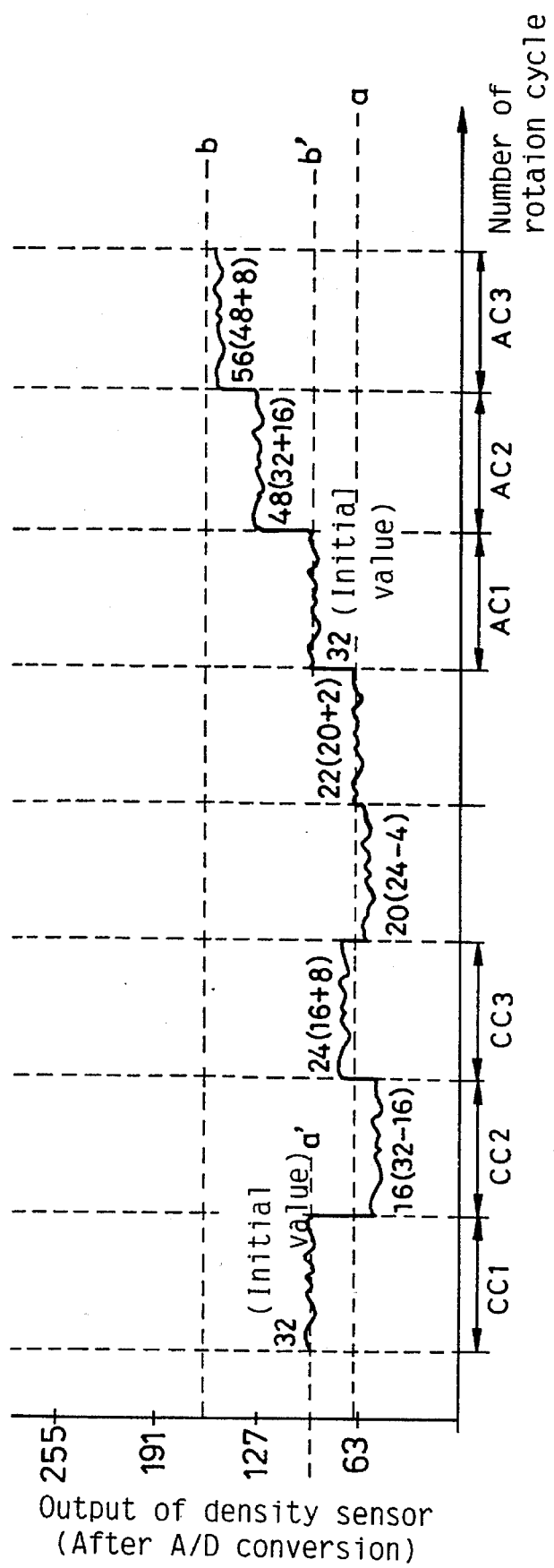

In a first stage of the gradation correction, light quantity of luminous part of the density sensor 25 is determined for every chromatic components (cyan, magenta, yellow) and achromatic component (black). Hereafter, adjustment of luminous quantity of the density sensor 25 will be described with reference to FIG. 3. In FIG. 3, an ordinate represents the number of rotation cycle of the intermediate transfer sheet 18, and an abscissa represents density data handled by the CPU 40 which is derived by applying analog-to-digital conversion to an output of the density sensor 25.

In measuring a density of the chromatic components after completion of cleaning the intermediate transfer sheet 18, an adjusting target value "a" of an output of the density sensor 25 at the time of detection of the surface density is made 1.25 V in analog level and 64 (=1.25[V]/5.00[V]×255) in data after the A/D conversion. The CPU 40 sets the D/A converter 41 with a mid value 32 in 6-bit (a first cycle CC1 of the chromatic components in FIG. 3), thereby letting the density sensor 25 emit light. Under this state, the intermediate transfer sheet 18 makes one turn. At every predetermined sampling cycle (e.g., 20 ms), surface density of the intermediate transfer sheet 18 is detected, and the detected values are summed up at the same time.

When one turn of the intermediate transfer sheet 18 is completed, the summed up value is divided by the sampling number, thereby calculating a mean value "a'" of the surface density. These mean value "a'" and the adjusting target value "a" (64) are compared with each other.

Then, in the first cycle CC1 of the chromatic components wherein "32" is set to the D/A converter 41, the mean value "a'" of the surface density is over the adjusting target value "a" of the surface density. Therefore, a judgment such that resetting of the light quantity is necessary is obtained.

In a second cycle CC2 of the chromatic components, the D/A converter 41 is set with 16 (=32−(32/2)). At that time, a margin of variation is 16. Since the mean value "a'" of the surface density is lower than the adjusting target value "a" in the second cycle CC2, resetting of the light quantity is also necessary. A margin of variation is 8 which is a half of the last margin of variation 16. Since the mean value "a'" is smaller than the adjusting target value "a", a judgment is that luminous quantity of the density sensor 25 must be increased. In a third cycle CC3 of the chromatic components, the D/A converter 41 is set with 24 (=16+8), and the above-mentioned operation is repeated. When a difference between the mean value "a'" and the adjusting target value "a" becomes smaller than a predetermined value, a present value set in the D/A converter 41 is stored in the memory. Output setting of the density sensor 25 at the time of detection of the surface density in measuring the density of the chromatic components, namely a luminous setting of the density sensor 25, is completed. When the difference is not smaller than the predetermined value, a margin of variation is made 1/2 further at every cycle unit. When the margin of variation becomes zero, adjusting operation of the luminous quantity is stopped.

Next, a luminous quantity of the density sensor 25 for detecting the density of the achromatic component is determined. This process is similar to that of the chromatic components. An adjusting target value "b" of the output of the density sensor 25 at the time of detection of the surface density is 3.0 V in analog level and 153 (=3.00[V]/5.00[V] ×255) in the data after the A/D conversion. These values are larger than those of the chromatic components.

The CPU 40 sets the D/A converter 41 with a mid value 32 in 6-bit (the first cycle of the chromatic components in FIG. 3), thereby letting the density sensor 25 emit light. Under this state, the intermediate transfer sheet 18 makes one turn. At every predetermined sampling cycle (e.g., 20 ms), surface density of the intermediate transfer sheet 18 is detected, and the detected values are summed up at the same time.

When one turn of the intermediate transfer sheet 18 is completed, the summed up value is divided by the sampling number, thereby calculating a mean value "b'" of the surface density. These mean value "b'" and the adjusting target value "b" (153) are compared with each other.

Then, in a first cycle AC1 of the achromatic component wherein "32" is set to the D/A converter 41, the mean value "b'" of the surface density is lower the adjusting target value "b" of the surface density. Therefore, a judgment that resetting of the light quantity is necessary is obtained.

In a second cycle AC2 of the chromatic components, the D/A converter 41 is set with 48 (=32+(32/2)). At that time, a margin of variation is 16. Since the mean value "b'" of the surface density is lower than the adjusting target value "b" in the second cycle AC2, resetting of the light quantity is also necessary. A margin of variation is 8 which is a half of the last margin of variation 16. Since the mean value "b'" is smaller than the adjusting target value "b", a judgment is that luminous quantity of the density sensor 25 must be increased. In a third cycle AC3 of the achromatic component, the D/A converter 41 is set with 56 (=48+8), and the above-mentioned operation is repeated. When a difference between the mean value "b'" and the adjusting target value "b" becomes smaller than a predetermined value, a present value set in the D/A converter 41 is stored in the memory. Setting of luminous quantity of the density sensor 25 is completed.

By the above-mentioned operation, the luminous quantity of the density sensor 25 for the chromatic components and the achromatic component is determined.

Second Stage

When the luminous quantity different from each other are determined for the chromatic components and the achromatic component, a second stage of the gradation control is started. In the second stage, saturation densities of the respective color toners are detected.

This saturation density means a density limit at which increase of the density stops even though the toner is further superimposed. In general, when monochromatic toner layers are superimposed on the paper 28 one after another, a rising curve of the toner density gradually becomes gentle. Finally, even though the toner is further superimposed, increase of the toner density stops, thus reaching the saturation state. Similarly, when the monochromatic same color toner is superimposed one after another on the intermediate transfer sheet 18, the output of the density sensor 25 saturates.

Figure 4:
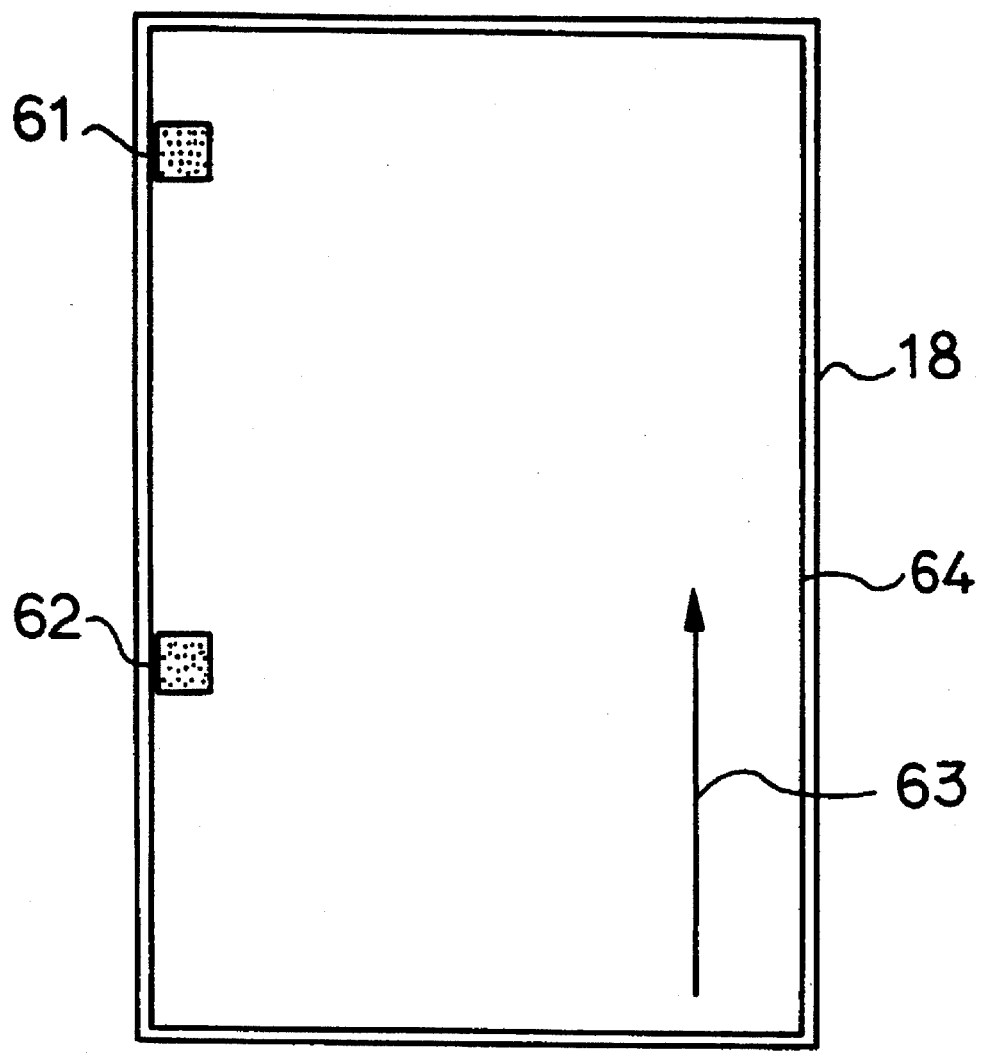

Hereupon, a test pattern for detecting the saturation density is described. FIG. 4 is an illustration showing the test pattern used in the electrophotography apparatus. To detect the saturation density, image data is made the maximum value (FFH). There are provided two pieces of the test patterns, and the saturation densities of black and magenta is detected at a position of the pattern 61. Also, the saturation density of yellow and cyan is detected at a position of the pattern 62 for detecting the saturation density. Numerals 63 and 64 designate a moving direction of the intermediate transfer sheet 18 and an image region of the intermediate transfer sheet 18, respectively.

Next, description will be made about a process for obtaining the saturation density by superimposing the monochromatic same color toner plural times on the intermediate transfer sheet 18.

First, rotation of the polygon mirror in the exposure optical system 9 is started. The photosensitive sheet 1 and the intermediate transfer sheet 18 are rotated in the directions of the arrows d1 and d2, respectively. Further, in the development devices 10K, 10Y, 10M and 10C, rotation of the respective sleeve rollers 16K, 16Y, 16M and 16C are started. At that time, the cleaning device 27 is detached from the intermediate transfer sheet 18 so that the toner image can be superimposed plural times on the intermediate transfer sheet 18.

When the respective drive sources are thus started, the charging wire in the charger 8 connected to the high voltage power source is impressed with a high voltage approximately from −4000 V to −5000 V, thereby causing the corona discharge. Further, a voltage of −700 V is applied to the grid of the charger 8, thereby charging the whole surface of the photosensitive sheet 1 with an equal potential of about −700 V. The discharger 14 is also operated, and a high voltage about +1000 V is applied to the intermediate transfer roller 12.

When a carrying speed of the intermediate transfer sheet 18 and the photosensitive sheet 1 reach a predetermined value, the position detection sensors 6 and 23 begin to detect the position detection marks 5 and 22, respectively. Based on a difference of detection time between these two marks 5 and 22, a control part, which controls the whole of the electrophotography apparatus, controls the electrophotography apparatus to avoid the commissure 7 of the photosensitive sheet 1 and selects the detection mark 22 by which a picture can be formed within the shortest time. Further, the control part calculates a delay time of the actual start of the picture formation process from the instance of detection of the position detection mark 22. In the subsequent picture formation processes, the position detection mark 22 selected at this time is utilized as a reference of starting the picture formation for all colors.

After a predetermined time lapses from an instance when the position detection mark 22 selected through the above-mentioned procedure is detected by the position detection sensor 23, a latent image of the test pattern (shown in FIG. 4) for detecting the saturation density is formed on the photosensitive sheet 1 with reference to the pattern data for detecting the saturation density provided in the electrophotography apparatus. Thereafter, the development device 10K makes contact with the photosensitive sheet 1, thereby revealing the latent image of the pattern 61 for detecting the saturation density. When the development at the position of the pattern 61 is completed, the development device 10K is restored to the home position. Subsequently, the development device 10M makes contact with the photosensitive sheet 1, thereby revealing the latent image of the pattern 62 shown in FIG. 4. During one turn of the photosensitive sheet 1, two development devices 10K and 10M for different colors from each other are driven to move into and out of contact with the photosensitive sheet 1, thus forming the test pattern of two colors at the same time.

The test pattern developed is transferred to the intermediate transfer sheet 18, and the test pattern transferred is carried to the position of the density sensor 25. Just before arrival of the pattern 61 at the position of the density sensor 25, the CPU 40 sets the D/A converter 41 with a luminous quantity for reading out the achromatic component and starts reading the output of the density sensor 25 against a black toner image. In reading the black toner density, the CPU 40 selects an A/D conversion port of the operational amplifier 56b in FIG. 2 and stores the read-in data at every predetermined sampling cycle in the RAM 42.

When plural times readings of the black toner density are completed, the CPU 40 sets the D/A converter 41 with a luminous quantity for reading the chromatic components. That is, reading-out of the output of the density sensor 25 against the magenta toner image is started. In reading this magenta toner image, the CPU 40 selects an A/D conversion port of the operational amplifier 56a in FIG. 2 and stores the read-in data at every predetermined sampling cycle in the RAM 42.

Thus, reading-out results of the patterns 61 and 62 for detecting the saturation density for black and magenta are stored in the RAM 42 in the time order. The reason why the A/D conversion ports are changed for black and magenta to thereby select the operational amplifiers different from each other is as follows: If the gain for the chromatic components is equal to the gain for the achromatic component, when the density of the chromatic components comes close to the saturation state, the output of the operational amplifier exceeds a reference potential (5 V) of the A/D conversion port in the CPU 40. Therefore, in the present embodiment, the density measurement of the chromatic components is carried out by amplifying the output of the density sensor 25 with a half gain for the achromatic component to be taken in the CPU 40, and the taken-in signal is doubled in a software process. According to this method, accuracy of reading-out lowers. However, accuracy in the visual characteristics is also low in the high density region such as the saturation density. It is therefore no problem to have such a small error.

The patterns 61 and 62 for detecting the saturation density, which are formed on the photosensitive sheet 1, are transferred onto the intermediate transfer sheet 18, thereby forming a first transfer layer. As to the patterns 61 and 62 on this first transfer layer, when the read-out of them is completed, the CPU 40 specifies addresses in the RAM 42 corresponding to positions of the patterns 61 and 62 and read out the read-in results. The CPU 40 sums up the read-in results and calculates the density data of the first layer for every colors to store them again in the RAM 42.

Reading of the second or the larger layer is carried out in the similar way to the first layer. That is, an image is formed on the photosensitive sheet 1 in the first place. The patterns 61 and 62 formed on the photosensitive sheet 1 are superimposed on the intermediate transfer sheet 18. The density is measured by the density sensor 25, and its data is stored in the RAM 42.

When the density measurement of the second layer is completed, the CPU 40 compares the density data of the first layer with the density data of the second layer. If a differential value of them is out of a predetermined range, the CPU 40 makes a judgment that the transfer from the photosensitive sheet i to the intermediate transfer sheet 18 is not normally executed. In general, an absolute value of the density data converges on a specific value in response to increase of the layers. If the defective transfer occurs, both the gradation correction and the ordinary printing deteriorate. Therefore, the CPU 40 immediately stops the electrophotography apparatus and displays an error message on the display device. Although in this embodiment the defective transfer is detected in accordance with a density rising ratios of the first layer and the second layer, judgment of the defective transfer is possible in accordance with the density data of only the first layer because the surface density has been known beforehand. Also, it is possible to make a judgment of the defective transfer by combining the density data with the density rising ratio.

Thus, single layer images are superimposed one after another. As a result, the toner density on the intermediate transfer sheet 18 saturates when four layers are superimposed. At that time, the CPU 40 catches the output signals of the density sensor 25 for black and magenta, respectively. These output signals are stored in the RAM 42 as a dark reference.

When the saturation density is detected, the cleaning device 27 moves to the contact position, thereby cleaning the intermediate transfer sheet 18.

When the dark reference of black and magenta was detected as mentioned above, a dark reference of yellow and cyan is detected subsequently as will be described in the following procedure.

After a predetermined time lapses from the time when the selected position detection mark 22 is detected by the position detection sensor 23, the latent image of the test pattern for detecting the saturation density shown in FIG. 4 is formed on the photosensitive sheet 1 with reference to the pattern data for detecting the saturation density which is stored in the electrophotography apparatus. After that, the yellow development device 10Y makes contact with the photosensitive sheet 1, thereby revealing the latent image of the saturation density detection pattern 61 shown in FIG. 4. When the development of the saturation density detection pattern 61 is completed, the development device 10Y is restored to its home position. Next, the cyan development device 10C makes contact with the photosensitive sheet 1, thereby revealing the latent image of the saturation density detection pattern 62 shown in FIG. 4.

The developed test patterns are transferred to the intermediate transfer sheet 18 and carried to the position of the density sensor 25. Just before the arrival of the saturation density detection pattern 61 at the position of the density sensor 25, the CPU 40 sets the D/A converter 41 with the luminous quantity necessary for reading the chromatic components, and it is started to read the output of the density sensor 25 for the yellow and cyan toner images. At that time, the CPU 40 selects the A/D conversion port of the operational amplifier 56a in FIG. 2 and takes signals therein with a predetermined sampling cycles to store the data in the RAM 42.

The read-in results of the saturation density detection patterns 61 and 62 for yellow and cyan are thus sequentially stored in the RAM 42 in the time order.

The patterns 61 and 62 for detecting the saturation density, which are formed on the photosensitive sheet 1, are transferred onto the intermediate transfer sheet 18, thereby forming a first transfer layer. As to the patterns 61 and 62 on this first transfer layer, when the read-out of them is completed, the CPU 40 specifies addresses in the RAM 42 corresponding to positions of the patterns 61 and 62 and read out the read-in results. The CPU 40 sums up the read-out results and calculates the density data of the first layer for every colors to store again in the RAM 42.

Reading of the second or the larger layer is carried out in the similar way to the first layer. That is, an image is formed on the photosensitive sheet 1 in the first place. The patterns 61 and 62 formed on the photosensitive sheet 1 are superimposed on the intermediate transfer sheet 18. The density is measured by the density sensor 25, and its data is stored in the RAM 42.

The above-mentioned processes are repeated as to a third layer and a forth layer. Thus, the toner density on the intermediate transfer sheet 18 saturates, and the CPU 40 obtains the output of the density sensor 25 at the time of saturation for yellow and cyan, respectively, to store them in the RAM 42 as the dark reference.

Third Stage

When the dark references for respective colors were detected as mentioned above, a third stage of the gradation correction is started. In this third and the larger stages, the cleaning device 27 is in contact with the intermediate transfer sheet 18, thereby always cleaning it.

In the third stage, the light quantity of the density sensor 25 is selected to adapt it for the measurement of the chromatic components or the measurement of the achromatic component, and the surface density of the intermediate transfer sheet 18, hence the highlight reference, is measured. This third stage is carried out when the selected position detection mark 22 is detected by the position detection sensor 23.

After a predetermined time lapses from the time when the selected position detection mark 22 is detected by the position detection sensor 23, the CPU 40 sets the D/A converter 41 with the luminous quantity for reading out the chromatic components, and the read-in of the output of the density sensor 25 is started. The output of the density sensor 25 is taken to the CPU 40 with a predetermined sampling cycle, and the CPU 40 immediately stores the read-in results in the RAM 42. For example, if the following conditions are given: an image region of the intermediate transfer sheet 18 is 370 mm; a carrying speed is 100 mm/s; and a sampling cycle is 10 ms. Then, 370 pieces of data are stored in the RAM 42 during one turn of the intermediate transfer sheet 18.

When the measurement of the surface density of the intermediate transfer sheet 18 is completed under the luminous quantity of the chromatic components, the CPU 40 sets the D/A converter 41 with the luminous quantity for detecting the achromatic component and waits for detection of the selected position detection mark 22 by the position detection sensor 23. When the position detection mark 22 is detected by the position detection sensor 23, the CPU 40 measures the surface density of the intermediate transfer sheet 18 under the luminous quantity for the achromatic component in the similar way to the chromatic components and stores the results in the RAM 42. When the measurement of the surface density of the intermediate transfer sheet 18 is completed under the luminous quantity for the achromatic component, the third stage of the gradation correction is completed.

Fourth Stage

Next, a fourth stage is started. In the fourth stage, the test pattern for the gradation correction, which has the gradation and is formed on the intermediate transfer sheet 18, is subjected to the detection of density for respective colors. Further, by utilizing the dark reference and the highlight reference obtained in the former stages, a table for correcting the 7 characteristic of the electrophotography apparatus will be made.

Figure 5:
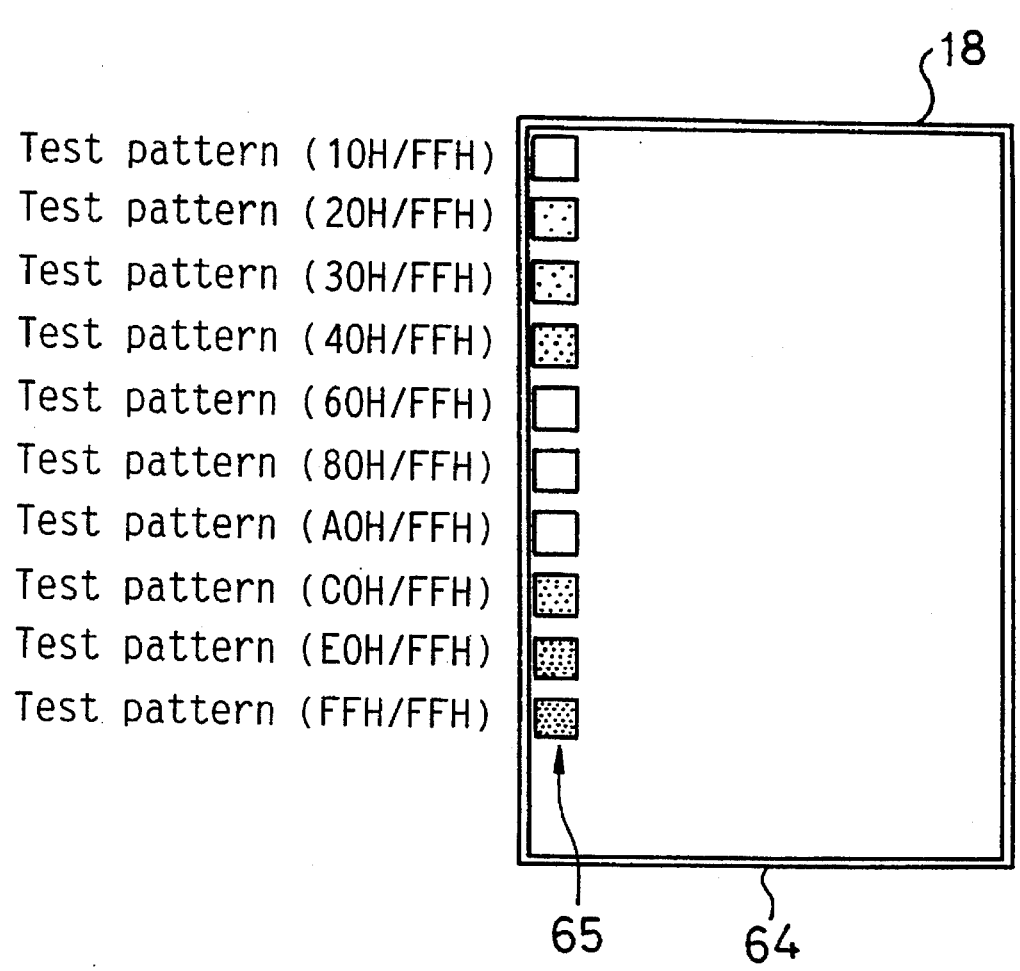

First, description will be made about the test pattern for the gradation correction. FIG. 5 is an illustration showing the test pattern 65 for the gradation control of the electrophotography apparatus. This test pattern includes medium tones.

This test pattern 65 is formed at the time of power-on or when appropriate conditions are prepared. The test pattern 65 is formed in an edge portion of the image region so that deterioration of the image quality can hardly be visible even when the pattern region is physically deteriorated due to many times formation of same patterns. There are ten patterns, and the image data are prepared beforehand so that these patterns may have different density from each other. For example, the first pattern is 10H in hexadecimal, and the next pattern is 20H. That is, the density increases gradually from top to bottom of the image.

Formation position of the gradation correction test pattern 65 in the intermediate transfer sheet 18 is commonly provided as to respective colors, and the image data are of common. The images of respective colors are formed by using screen angles different from each other. These screen angles are made equal to screen angles for printing the image data transferred from a host computer etc.

Figure 6:
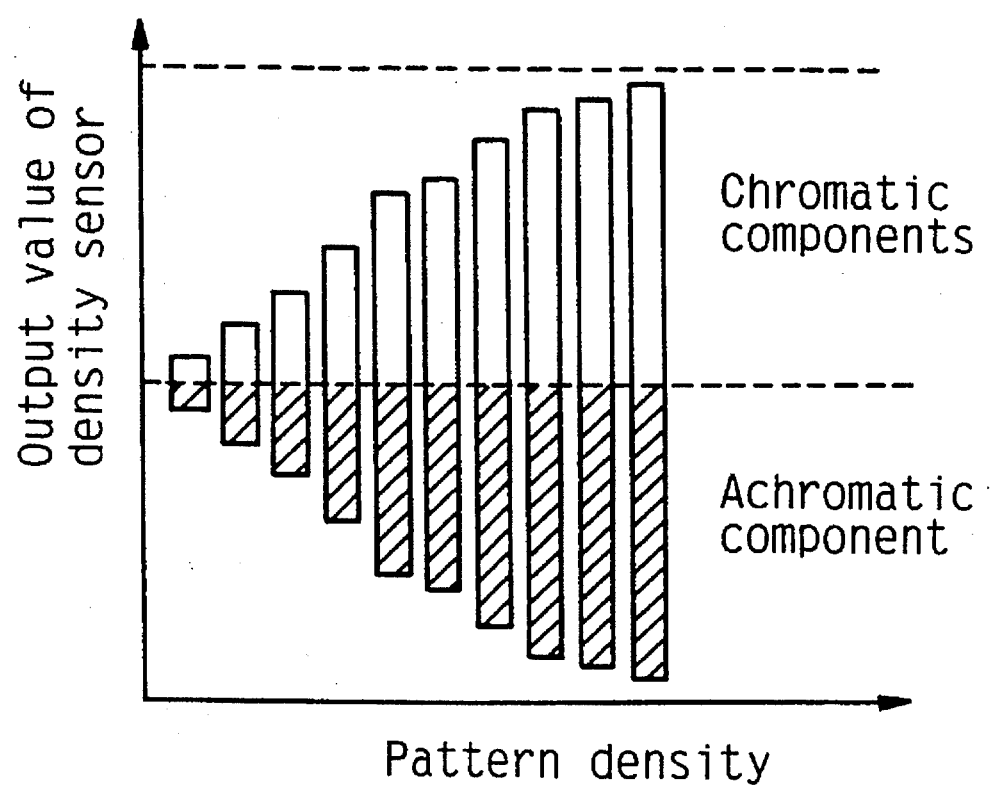

Next, description will be made with reference to FIG. 6 about a characteristic of detecting the toner of the chromatic components and the achromatic component formed on the intermediate transfer sheet 18 with the density sensor 25. FIG. 6 is a graph showing the output of the density sensor for the gradation correction test pattern of the chromatic components (cyan, magenta and yellow) and the achromatic component (black) in the electrophotography apparatus.

For the simplicity of illustration, a center dotted line means the output of the density sensor 25 which detects the intermediate transfer sheet 18 having no toner. As to the pattern of the chromatic components and the achromatic component, the density increases sequentially from the first to the end.

In the chromatic components, when the density of the gradation correction test pattern increases, the output of the density sensor 25 rises. Strictly speaking, characteristics are different from each other for respective colors. However, there is no difference in a respect that the output of the density sensor monotonously rises in response to increase of the pattern density.

On the other hand, when the pattern of the achromatic component is detected under the condition same as above, the output of the density sensor 25 monotonously lowers in response to increase of the pattern density. It is a distinct feature between the chromatic components and the achromatic component that these outputs rises and lowers in contrast with each other with respect to the horizontal center of the graph which means the surface level of the intermediate transfer sheet 18.

The intermediate transfer sheet 18, which is a dielectric member, has a black color due to presence of the scattered carbon, a smooth surface and a certain reflectance. In detecting the chromatic components accordingly, both the reflectance of the toner and the diffusion of light increase, thereby monotonously increasing the output of the density sensor 25. As to the achromatic component, irradiation light emitted from the density sensor 25 is absorbed by the toner surface in response to the pattern density. The output of the density sensor 25 is therefore monotonously decreased.

Next, a method for forming the test pattern for the gradation correction will be described. After a predetermined time lapses from the time when the position detection mark 22 selected in the second stage of the gradation correction is detected by the position detection sensor 23, a latent image of the gradation correction test pattern is formed on the photosensitive sheet 1 with reference to the density data stored in the electrophotography apparatus. This latent image is developed by touching the photosensitive sheet 1 with the black development device 10K. The developed black test pattern for the gradation correction is transferred to the intermediate transfer sheet 18 and is carried to the density sensor 25.

Further, after a predetermined time lapses, the CPU 40 sets the D/A converter 41 with a luminous quantity necessary for reading the achromatic component, and the CPU 40 starts reading an output of the density sensor 25. The output of the density sensor 25 is taken into the CPU at every predetermined sampling cycle. This read-in operation is executed for all the picture area, and the CPU 40 immediately stores a read-in result in the RAM 42.

When the density measurement of the gradation correction test pattern for the achromatic component is completed as described above, the CPU 40 sets the D/A converter 41 with the luminous quantity for reading out the chromatic components. The CPU 40 waits for secondary detection of the position detection mark 22 selected at the second stage of the gradation correction by the position detection sensor 23. After that, by utilizing the gradation correction test pattern same as black, density measurements for cyan, magenta and yellow are carried out. The CPU 40 stores measuring results in the RAM 42 in the way similar to the black.

As aforementioned, the cleaning device 27 is in contact with the intermediate transfer sheet 18 and always cleaning it. Therefore, the density sensor 25 can read the gradation correction sequentially for respective colors.

In the above-mentioned operation, what is stored in the RAM 42 is: the surface density for the intermediate transfer sheet 18 under the light quantity for the achromatic component; the density detection result of the gradation correction test pattern for the achromatic component; the surface density of the intermediate transfer sheet 18 under the light quantity for the chromatic components; and the respective density detection results of the gradation correction test patterns for cyan, magenta and yellow. However, these data have been derived by merely storing the output of the density sensor 25 in the time order. Therefore, when formation and reading-in of the gradation correction test pattern is completed, operation of each motor and the charger 8 etc. in the electrophotography apparatus are stopped, and thereafter it is necessary to execute data processing.

Since all the data stored in the RAM 42 is based on the identical detection of the position detection mark 22, a start point of reading-in for the surface density and the gradation correction test pattern is always an identical point on the intermediate transfer sheet 18. Since a time period from the detection of the position detection mark 22 till the CPU 40 starts reading the output of the density sensor 25 is fixed, it is easy to obtain the density data corresponding to respective positions of the gradation correction test pattern. For instance, measurement values of 8 points per one gradation correction test pattern are summed up, and a mean value of these measurement values is handled as a density value of one pattern. Thus, the surface density of the position of each pattern under the light quantity for the achromatic component and the toner density are obtained. Also, the surface density of the position of each pattern under the light quantity for the chromatic components and the toner densities of cyan, magenta and yellow are obtained.

Figure 7:
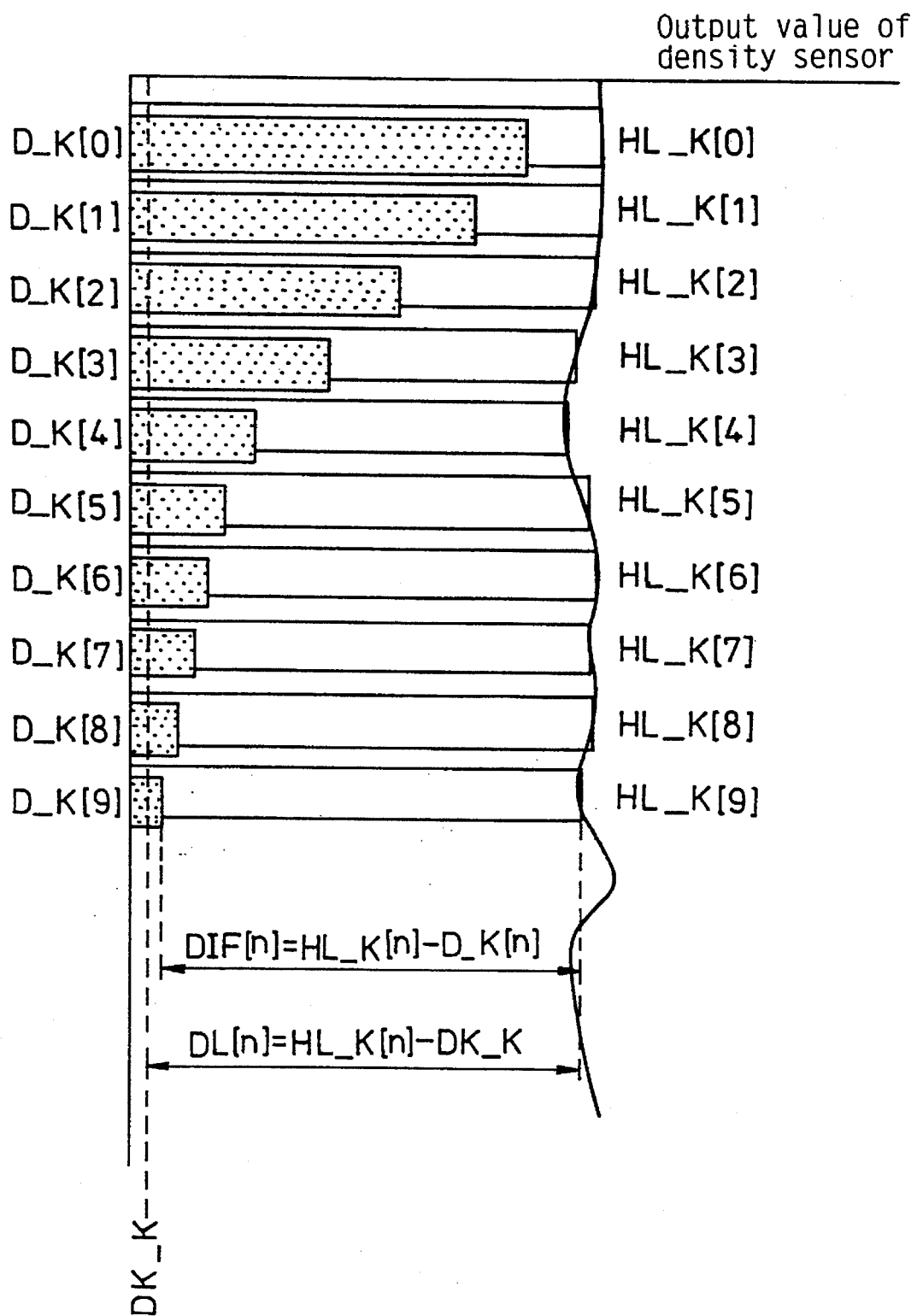

When the density measurements of the gradation correction test patterns for respective colors are completed, a gradation correction table can be made by utilizing the dark reference obtained in the second stage and the highlight reference obtained in the third stage. Next, data processing for black (achromatic component) and cyan (chromatic component) will be described. Since the data processing for magenta or yellow is the same as cyan, description about magenta and yellow is omitted. In the following description, when a position of each pattern is represented as n (n=0, 1, 2, . . . , 9), the surface density of black at the position n is HL_K[n], and the surface density of cyan at the position n is HL_CMY[n]. Toner densities for the gradation correction test pattern is represented as D_C[n] for cyan and D_K[n] for black. The letter D means "density". The dark reference for black is represented as DK_K, and the dark reference for cyan is represented as DK_C. The letter DK means "dark". Since the dark reference has no relation to the position of pattern, there is nothing of arrangement elements. First, the data processing for black will be described. FIG. 7 is a graph showing a relation among the density measurement result for each pattern of black, the highlight reference and the dark reference and a data processing.

The data processing of black is carried out by utilizing the dark reference DK_K, the density data D_K[n] for each pattern and the highlight reference HL_K[n].

As to respective values of n, the following calculation is carried out:

$$DIF[n]=HL\_K[n]-D\_K[n],$$

wherein a true density level is represented as DIF[n].

As to respective values of n, the following calculation is carried out:

$$DL[n]=HL\_K[n]-DK\_K,$$

wherein a dynamic range for each pattern is represented as DL[n].

Next, the true density level DIF[n] is normalized with 8-bit against the dynamic range DL[n]. That is, a normalized value NM[n] is calculated per every pattern with the following equation:

$$NM[n]=DIF[n]\times 255/DL[n].$$

Figure 8:
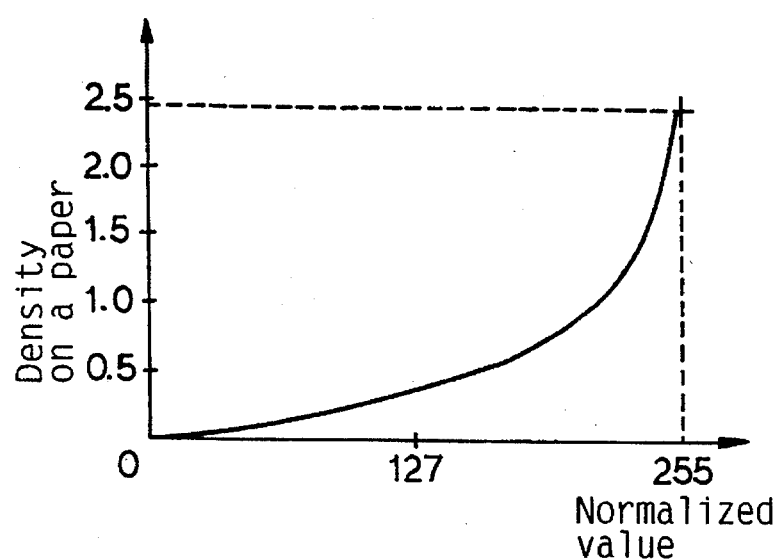

Hereupon, a density conversion table for black will be described with reference to FIG. 8. FIG. 8 is a graph plotted with the density conversion table for black in the electrophotography apparatus. In FIG. 8, an abscissa represents values of the output of the density sensor 25 (FIG. 1) normalized with the above-mentioned method. An ordinate represents density (Macbeth density) when the same pattern is formed on the paper 28 (FIG. 1).

This density conversion table is easily made by the detected and normalized data based on the gradation correction pattern 65 (FIG. 5) and the saturation density detection patterns 61 and 62 (FIG. 4) formed on the intermediate transfer sheet 18 (FIG. 1) and a sample that the pattern same as the pattern formed on the intermediate transfer sheet 18 is transferred and fixed onto the paper 28 (FIG. 1).

In the density conversion table for black, the density of the paper 28 against the normalized value rapidly varies in the medium and high density regions. Therefore, the higher the density of the gradation correction test pattern rises, the lower an accuracy of the density conversion table is.

However, black is auxiliarily used in the full color image, and a visual characteristic of human becomes dull of perceiving a density difference in response to rise of the density. Therefore, it is not serious to the full color image that the accuracy of the density conversion table lowers in the high density region.

Figure 9:
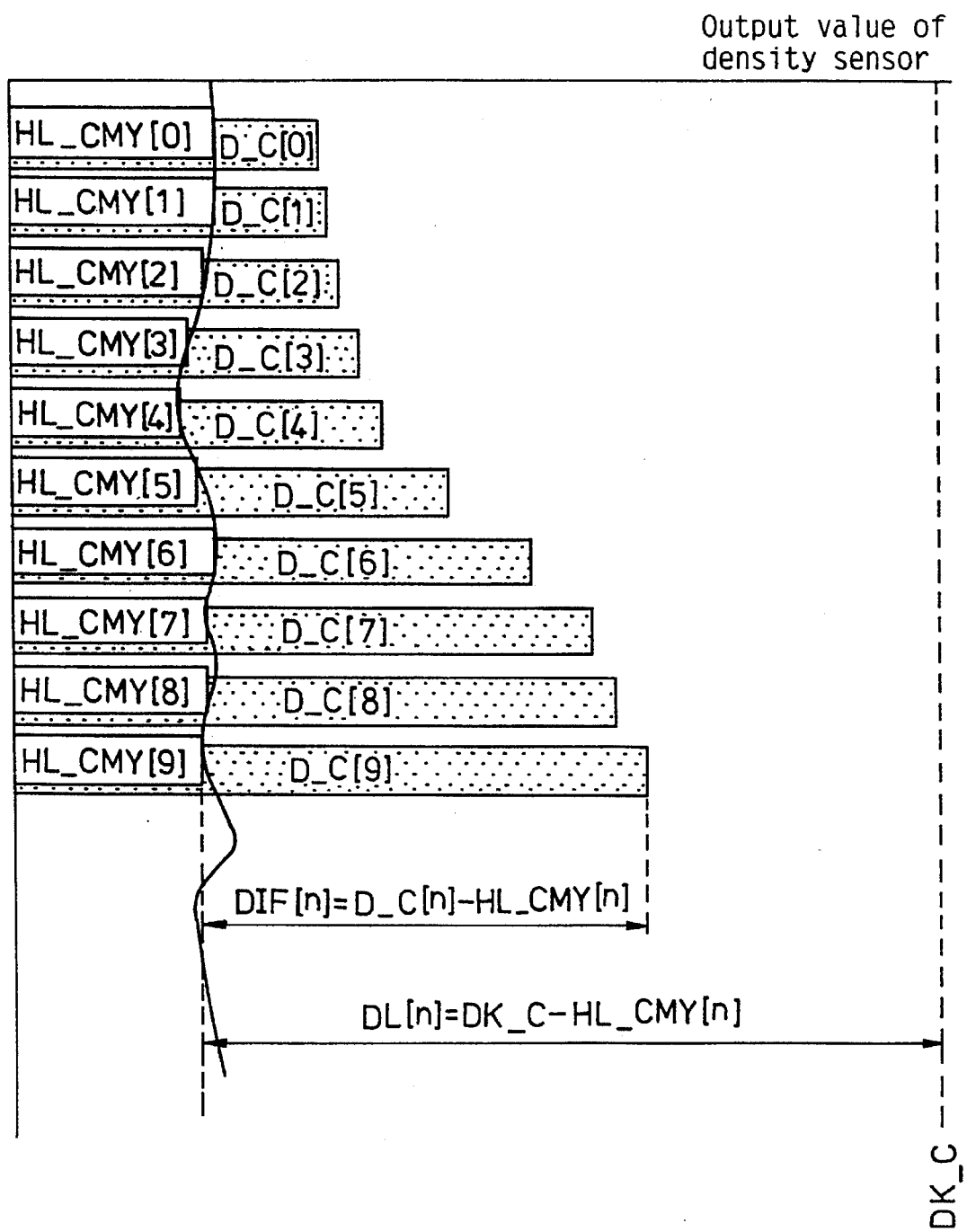

Next, the data processing for cyan will be described. FIG. 9 is a graph showing a relation among the density measurement result for each pattern of cyan, the highlight reference and the dark difference and the data processing.

In the data processing for cyan, the density data D_C[n] for each pattern, the highlight reference HL_CMY[n] and the dark reference DK_C are used.

As to respective values of n, the following calculation is carried out:

$$DIF[n]=D\_C[n]-HL\_CMY[n],$$

wherein a true density level is represented as DIF[n].

As to respective values of n, the following calculation is carried out:

$$DL[n]=DK\_C-HL\_C[n],$$

wherein a dynamic range for each pattern is represented as DL[n].

Next, the true density level DIF[n] is normalized with 8-bit against the dynamic range DL[n]. That is, a normalized value NM[n] is calculated per every pattern with the following equation:

$$NM[n]=DIF[n]\times 255/DL[n].$$

Further, the normalized data are converted into the density on the paper 28. This density conversion is carried out by using the density conversion table which has been prepared by experiment beforehand.

Figure 10:
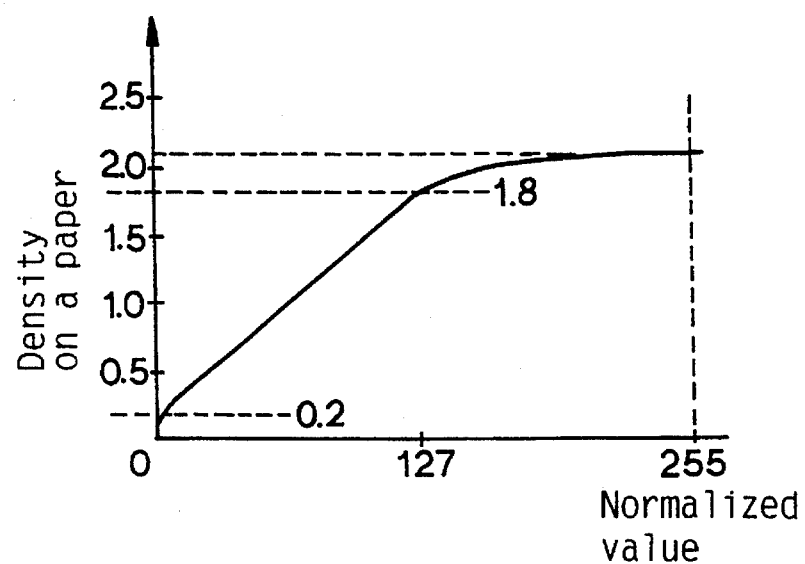

Hereupon, a density conversion table for black will be described with reference to FIG. 10. FIG. 10 is a graph plotted with the density conversion table for black in the electrophotography apparatus. In FIG. 10, an abscissa represents values of the output of the density sensor 25 (FIG. 1) normalized with the above-mentioned method. An ordinate represents density (Macbeth density) when the same pattern is formed on the paper 28 (FIG. 1).

This density conversion table is easily made by the detected and normalized data based on the gradation correction pattern 65 (FIG. 5) and the saturation density detection patterns 61 and 62 (FIG. 4) formed on the intermediate transfer sheet 18 (FIG. 1) and a sample that the pattern same as the pattern formed on the intermediate transfer sheet 18 is transferred and fixed onto the paper 28 (FIG. 1).

The density conversion table for cyan has an excellent linearity in an actually used density region (about 0.2–1.8). As to other chromatic components (e.g., magenta and yellow), although they have respective saturation density values on the paper 28, their linearities in the actually used region are also good, thus presenting a very advantageous characteristic in making the gradation correction. When the highlight reference and the dark reference are fixed in a phase of measurement, a configuration of the graph of the chromatic components is almost uniform. It is therefore possible to estimate the density on the paper 28 correctly from the data having been normalized.

The data of the gradation correction test pattern, hence the input, has a predetermined known value. A relation between this input data and the normalized value obtained as above-mentioned brings the γ characteristic of the electrophotography apparatus.

Therefore, when a relation between the input data and the density on the paper 28 is obtained, a gradation correction table which is a reverse function of the γ characteristic is obtained.

Since the density conversion table is used to convert the output of the density sensor 25 into the image density on the paper 28, the table includes a transfer characteristic of transferring the toner image onto the paper 28 and a fixing characteristic. In case where the paper transfer characteristic and the fixing characteristic vary in dependent on the environmental condition etc., thereby resulting in deterioration of the gradation, the influence given by change of the environmental condition can be compensated by changing the characteristic of the density conversion table in accordance with an environmental parameter etc.

GRADATION CORRECTION CONTROL

Next, a relation between the image data and the gradation correction table will be described with reference to FIG. 11.

Figure 11:
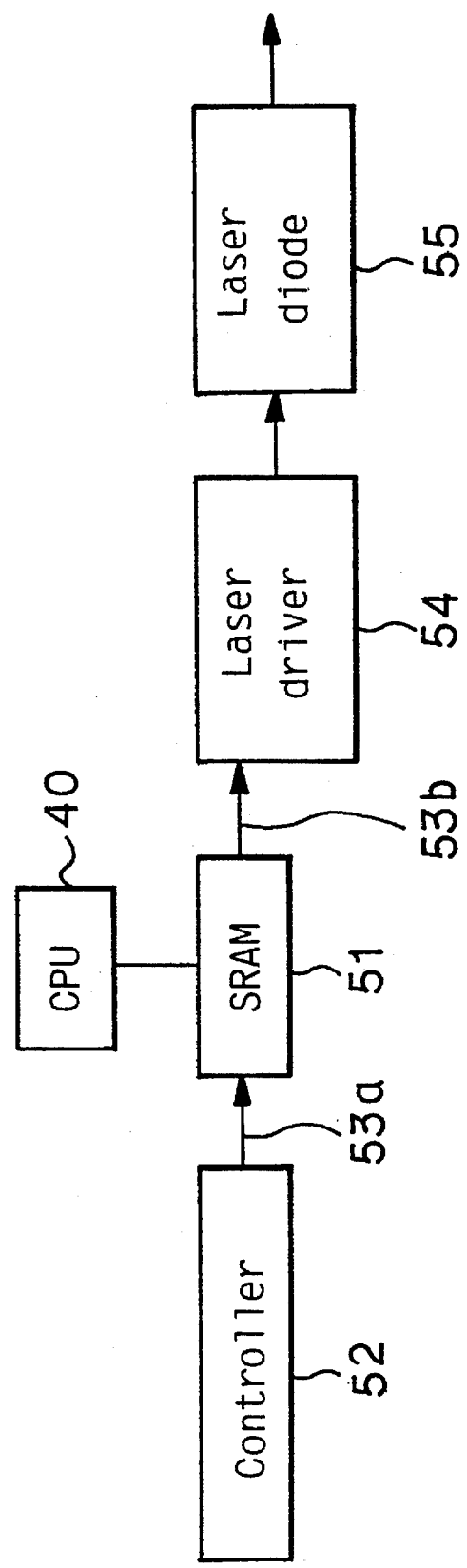
Figure 12:
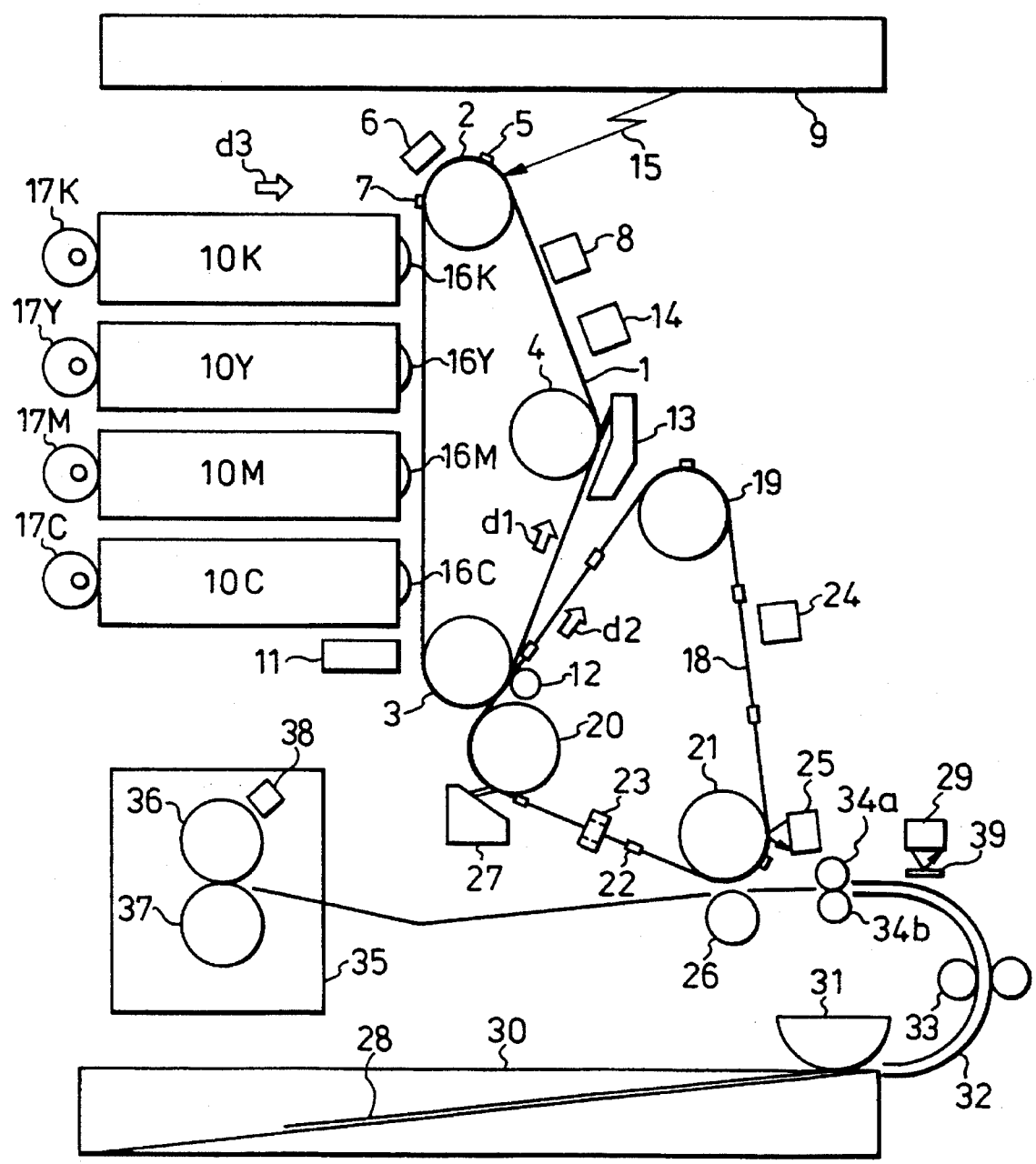
FIG. 12 is an illustration showing the conventional electrophotography apparatus.
Figure 13:
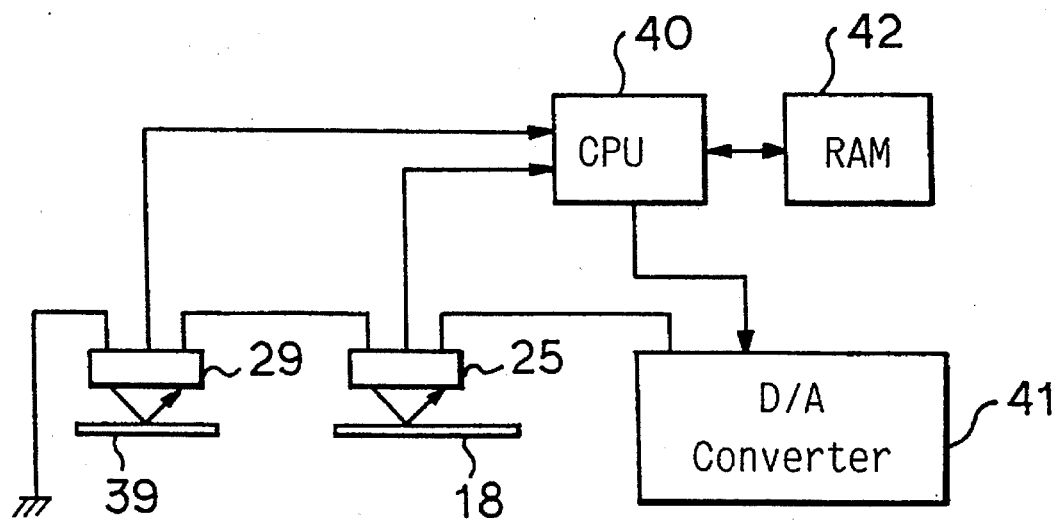
FIG. 13 is a block diagram showing the density sensor and the conventional peripheral circuits therefor.
Figure 14:
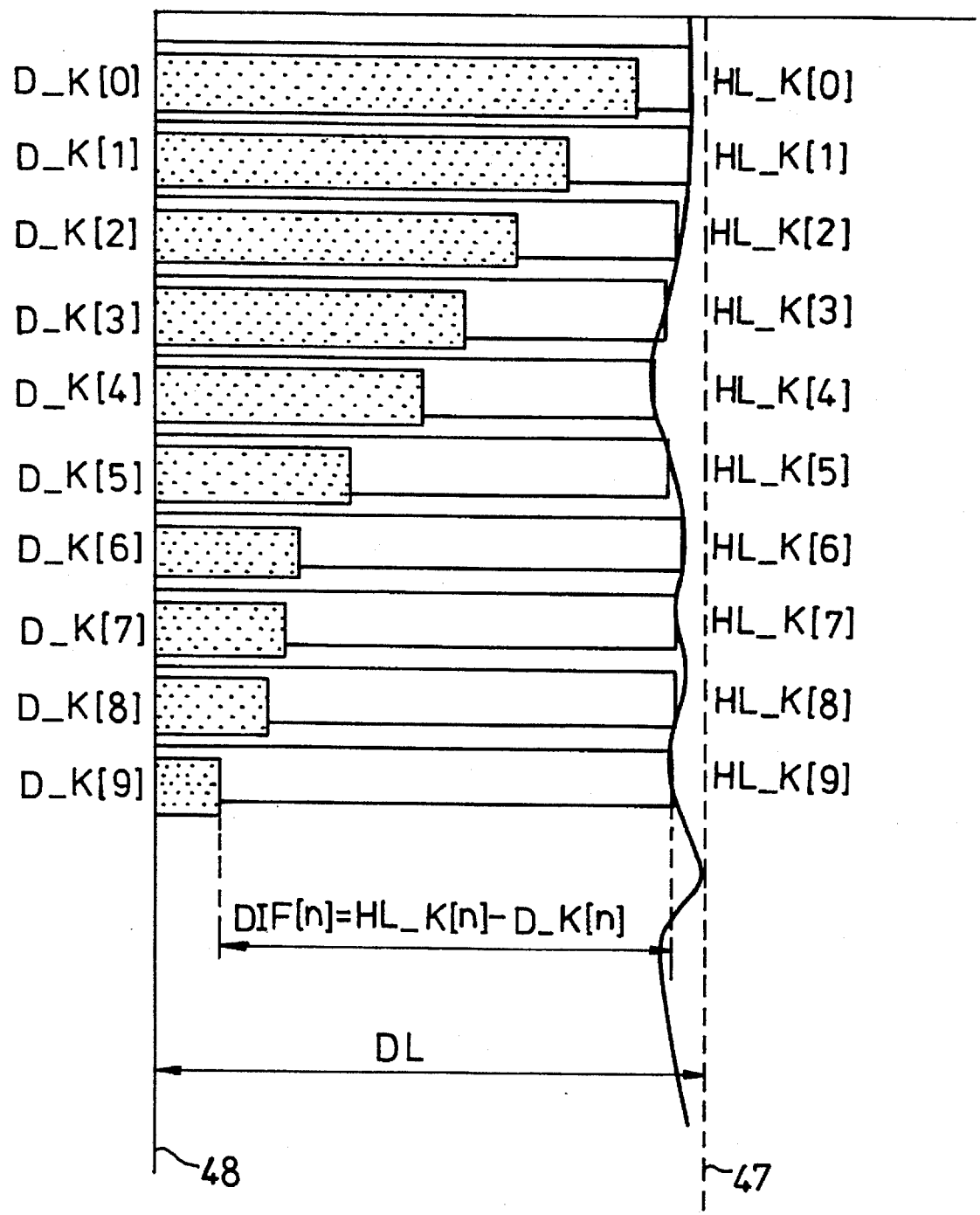
FIG. 14 is a graph showing the conventional relation between the density measurement results and the highlight reference.
Figure 15:
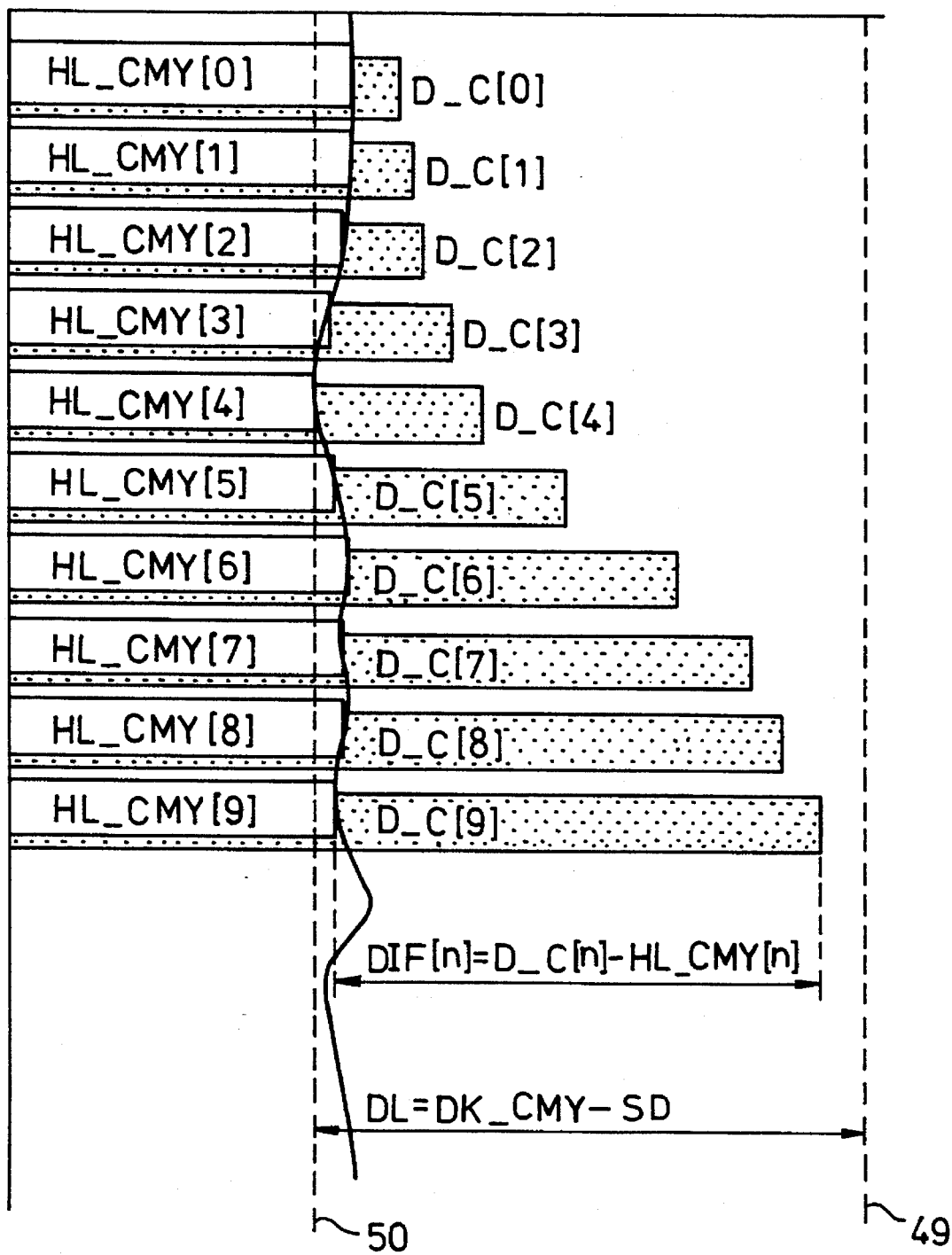
FIG. 15 is a graph showing the conventional relation among the density measurement results for each pattern, the highlight reference and the dark reference and the data processing.

FIG. 11 is a block diagram showing a circuit configuration for processing the image data with the gradation correction table. In FIG. 11, the CPU 40 sends the data of the gradation correction table to an SRAM (Static RAM) 51. When an address in the SRAM 51 has access with the image data 53a issued from a controller 52, the image data to which the gradation correction is given is issued from the SRAM 51 to a laser driver 54. In "the laser driver 54, pulse width modulation is executed in response to the image data 53b, thereby letting the laser diode 55 emit light. According to the above-mentioned correction in which the image data 53a is converted into the image data 53b with the gradation correction table, the $\gamma$ characteristic of the electrophotography apparatus is offset by the gradation correction table. Therefore, when the image data 53a having a uniform step is issued from the controller 52, the image density on the paper 28 has also the uniform step. Thus, the gradation of the image is secured.

SUPPLEMENTAL DESCRIPTION

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. An electrophotography apparatus comprising:

latent image formation means for forming a latent image on a photosensitive member;

development means for developing said latent image to a toner image with toner;

transfer means for transferring said toner image onto a transfer member;

density detection means for detecting a density of a toner image transferred onto said transfer member; and gradation correction means for correcting gradation of a toner image to be formed, said gradation correction means correcting said gradation by referring to an output value of said density detection means at an instance when said density detection means detects said toner image of saturation density transferred onto said transfer member.

2. An electrophotography apparatus in accordance with claim 1, wherein said gradation correction means corrects a $\gamma$ characteristic of said electrophotography apparatus.

3. An electrophotography apparatus comprising:

latent image formation means for forming a latent image on a photosensitive member;

development means for developing said latent image to a toner image with toner;

transfer means for transferring said toner image onto a transfer member;

density detection means for detecting a density of a toner image transferred onto said transfer member; and gradation correction means which superimposes a toner image plural times on an identical region of said transfer member to form a repeatedly transferred toner image and refers to an output value of said density detection means at an instance when said density detection means detects said repeatedly transferred toner image.

4. An electrophotography apparatus comprising:

latent image formation means for forming a latent image on a photosensitive member;

development means for developing said latent image to a toner image with toner;

transfer means for transferring said toner image onto a transfer member;

density detection means for detecting a density of a toner image transferred onto said transfer member; and gradation correction means for correcting gradation of a toner image to be formed, said gradation correction means correcting said gradation by detecting said toner image of saturation density and plural toner images having densities different from each other which are transferred onto said transfer member.

5. An electrophotography apparatus comprising:

latent image formation means for forming a latent image on a photosensitive member;

development means for developing said latent image to a toner image with toner;

transfer means for transferring said toner image onto a transfer member;

density detection means for detecting a density of a toner image transferred onto said transfer member; and gradation correction means which superimposes a toner image plural times on an identical region of said transfer member to form a repeatedly transferred toner image and corrects gradation by detecting said repeatedly transferred toner image and plural toner images having densities different from each other.

6. An electrophotography apparatus in accordance with claim 5, wherein said gradation correction means corrects a $\gamma$ characteristic of said electrophotography apparatus.

7. An electrophotography apparatus comprising:

latent image formation means for forming a latent image on a photosensitive member;

development means for developing said latent image to a toner image with toner;

transfer means for transferring said toner image onto a transfer member, said transfer means superimposing a toner image plural times on an identical region of said transfer member to form a repeatedly transferred toner image;

density detection means for detecting a density of a toner image transferred onto said transfer member; and gradation correction means for correcting gradation by normalizing outputs of said density detection means when said density detection means detects plural toner images which have densities different from each other and have been transferred onto said transfer member, said gradation correction means normalizing said outputs with reference to a dark reference which is an output of said density detection means detecting said repeatedly transferred toner image and a highlight reference which is an output of said density detection means detecting a surface density of said transfer means.

8. An electrophotography apparatus in accordance with claim 7, wherein
said gradation correction means corrects a γ characteristic of said electrophotography apparatus.

9. An electrophotography apparatus comprising:
a photosensitive member on which a latent image is formed at every color;
development means for developing said latent image to a toner image with toner;
an intermediate transfer member on which said toner image is superimposed at every color to form a color toner image, said intermediate transfer member having a toner image superimposed plural times on an identical region thereof to form a repeatedly transferred toner image;
density detection means for detecting a density of a toner image transferred onto said intermediate transfer member;
transfer means for transferring said color toner image to a transfer destination member; and
gradation correction means for correcting gradation with reference to data obtained by normalizing outputs of said density detection means when said density detection means detects plural toner images which have densities different from each other and have been transferred onto said transfer member, said gradation correction means normalizing said outputs with reference to a dark reference which is an output of said density detection means detecting said repeatedly transferred toner image and a highlight reference which is an output of said density detection means detecting a surface density of said transfer means.

10. An electrophotography apparatus in accordance with claim 9, wherein
said gradation correction means converts said data into a density on said transfer member and corrects gradation in accordance with said density.

11. An electrophotography apparatus in accordance with claim 10, wherein
gradation correction executed by said gradation correction means is to make a proportional relation between an input image density and an image recorded on said transfer destination member.

12. An electrophotography apparatus in accordance with claim 9, wherein
said gradation correction means corrects a γ characteristic of said electrophotography apparatus.

13. An electrophotography apparatus comprising:
a member on which toner is attached in accordance with information of image;
density detection means for detecting a density of a toner image attached on said member, said density detection means detecting a toner image having a saturation density attached on said member as first information and detecting plural toner images having densities different from each other as second information;
transfer means for transferring said toner image onto a transfer destination member;
gradation correction means for correcting gradation of a toner image to be formed, said gradation correction means correcting said gradation by referring to said first information and said second information.

14. An electrophotography apparatus in accordance with claim 13, wherein
said gradation correction means corrects a γ characteristic of said electrophotography apparatus.

15. An electrophotography apparatus comprising:
latent image formation means for forming a latent image on a photosensitive member;
development means for developing said latent image to a toner image with toner;
transfer means for transferring said toner image onto a transfer member;
density detection means for detecting a density of a toner image transferred onto said transfer member; and
gradation correction means for correcting gradation by referring to an output value of said density detection means at an instance when said density detection means detects said toner image of saturation density transferred onto said transfer member, said saturation density being a density limit at which increase of the density stops even though toner is further superimposed.

16. An electrophotography apparatus in accordance with claim 15, wherein said gradation correction means corrects a γ characteristic of said electrophotography apparatus.

17. An electrophotography apparatus comprising:
latent image formation means for forming a latent image on a photosensitive member;
development means for developing said latent image to a toner image with toner;
transfer means for transferring said toner image onto a transfer member;
density detection means for detecting a density of a toner image transferred onto said transfer member; and
gradation correction means for correcting gradation by detecting said toner image of saturation density and plural toner images having densities different from each other which are transferred onto said transfer member, said saturation density being a density limit at which increase of the density stops even though toner is further superimposed.

18. An electrophotography apparatus comprising:
a member on which toner is attached in accordance with information of image;
density detection means for detecting a density of a toner image attached on said member, said density detection means detecting a toner image having a saturation density attached on said member as first information and detecting plural toner images having densities different from each other as second information, said saturation density being a density limit at which increase of the density stops even though toner is further superimposed;

transfer means for transferring said toner image onto a transfer destination member; and gradation correction means for correcting gradation by referring to said first information and said second information.

19. An electrophotography apparatus in accordance with claim 18 wherein said gradation correction means corrects a γ characteristic of said electrophotography apparatus.

* * * * *